(12) United States Patent
Boulanger et al.

(10) Patent No.: US 10,663,130 B2
(45) Date of Patent: *May 26, 2020

(54) LIGHTING ARRANGEMENT WITH BATTERY BACKUP

(71) Applicant: CP IP Holdings Limited, Hong Kong (CN)

(72) Inventors: Dave Boulanger, Hong Kong (CN); Maciej Nowakowski, West Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/205,290

(22) Filed: Nov. 30, 2018

(65) Prior Publication Data

US 2019/0101257 A1    Apr. 4, 2019

Related U.S. Application Data

(63) Continuation-in-part of application No. 16/032,321, filed on Jul. 11, 2018, now Pat. No. 10,174,887, (Continued)

(51) Int. Cl.
| | |
|---|---|
| *F21V 11/00* | (2015.01) |
| *F21S 9/02* | (2006.01) |
| *F21V 23/00* | (2015.01) |
| *F21V 23/04* | (2006.01) |
| *F21V 3/04* | (2018.01) |
| *F21V 17/16* | (2006.01) |
| *F21V 15/01* | (2006.01) |
| *H05B 33/08* | (2020.01) |
| *H02J 9/00* | (2006.01) |

(Continued)

(52) U.S. Cl.
CPC ............ *F21S 9/024* (2013.01); *F21S 9/022* (2013.01); *F21V 3/049* (2013.01); *F21V 15/01* (2013.01); *F21V 17/162* (2013.01); *F21V 17/164* (2013.01); *F21V 23/007* (2013.01); *F21V 23/04* (2013.01); *H02J 9/00* (2013.01); *H05B 33/0842* (2013.01); *H05B 45/00* (2020.01); *H05B 45/37* (2020.01); *H05B 45/48* (2020.01); *F21S 8/024* (2013.01); *F21S 8/026* (2013.01); *F21V 19/0035* (2013.01); *F21Y 2103/33* (2016.08); *F21Y 2105/18* (2016.08); *F21Y 2115/10* (2016.08)

(58) Field of Classification Search
None
See application file for complete search history.

(56) References Cited

U.S. PATENT DOCUMENTS 10,174,887 B2 * 1/2019 Boulanger ............... F21L 4/08

* cited by examiner

*Primary Examiner* — Vip Patel
(74) *Attorney, Agent, or Firm* — Black, McCuskey, Souers & Arbaugh, LPA

(57) ABSTRACT

A lighting arrangement can include a light emitter portion and a battery backup portion. The light emitter portion can have a plurality of light emitting diodes and circuitry including a rectifier for driving the light emitting diodes. The battery backup portion can be in electronic communication with the rectifier of the light emitter portion and have a battery portion and a converter portion with a DC-AC inverter and a microcontroller unit configured to route AC power to the rectifier from either a primary AC source or the battery portion. The light emitter portion can be configured to be mounted to at least one of a wall and a ceiling during use. The battery backup portion can be positioned within the trim, with the plurality of light emitting diodes in the array string.

21 Claims, 33 Drawing Sheets

Related U.S. Application Data which is a continuation-in-part of application No. 15/248,665, filed on Aug. 26, 2016, now Pat. No. 10,039,161, and a continuation-in-part of application No. 14/986,760, filed on Jan. 4, 2016, now Pat. No. 9,921,364, and a continuation-in-part of application No. 14/956,416, filed on Dec. 2, 2015, now Pat. No. 10,168,031.

(60) Provisional application No. 62/210,464, filed on Aug. 27, 2015, provisional application No. 62/099,492, filed on Jan. 3, 2015, provisional application No. 62/086,820, filed on Dec. 3, 2014.

(51) Int. Cl.
*H05B 45/00* (2020.01)
*H05B 45/37* (2020.01)
*H05B 45/48* (2020.01)
*F21S 8/02* (2006.01)
*F21Y 115/10* (2016.01)
*F21Y 105/18* (2016.01)
*F21V 19/00* (2006.01)
*F21Y 103/33* (2016.01)

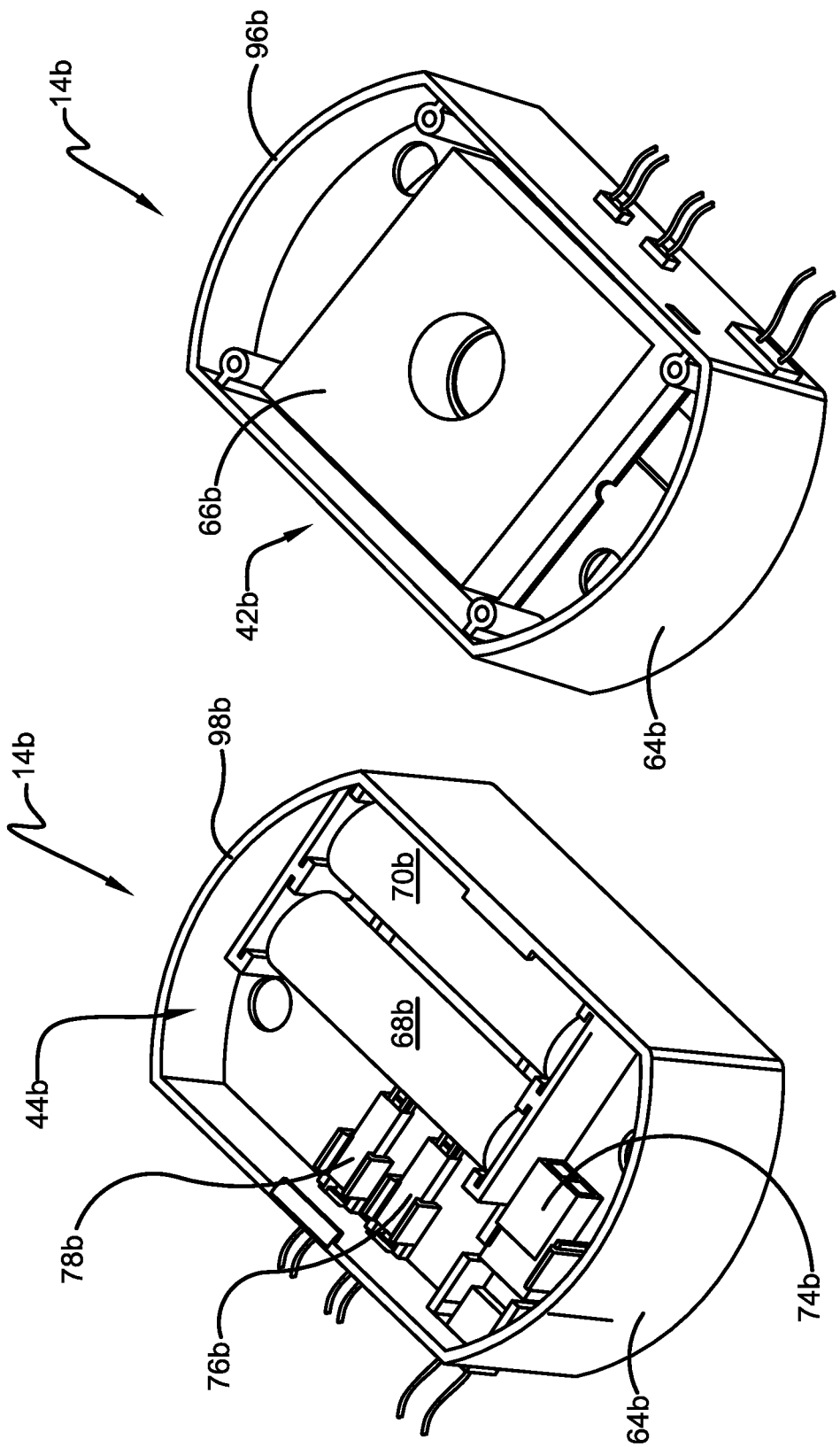

LIGHTING ARRANGEMENT WITH BATTERY BACKUP

CROSS-REFERENCE TO RELATED APPLICATIONS

This application is a continuation-in-part of pending U.S. patent application Ser. No. 16/032,321 (hereafter the '321 application), for a LIGHTING ARRANGEMENT WITH BATTERY BACKUP, filed on 11 Jul. 2018. The '321 application was a continuation-in-part of U.S. patent application Ser. No. 15/248,665 (hereafter the '665 application) for a LIGHTING ARRANGEMENT WITH BATTERY BACKUP, filed on 8 Aug. 2016, now U.S. Pat. No. 10,039,161 issued 31 Jul. 2018. The '665 application claimed priority to U.S. Prov. Pat. App. Ser. No. 62/210,464, filed 27 Aug. 2015. The '321 application was also a continuation-in-part of pending U.S. patent application Ser. No. 14/956,416 (hereafter the '416 application) for a LIGHTING ARRANGEMENT, filed on 2 Dec. 2015. The '416 application claims priority to U.S. Prov. Pat. App. Ser. 62/086,820, filed 3 Dec. 2014. The '321 application was also a continuation-in-part of U.S. patent application Ser. No. 14/986,760 (hereafter the '760 application) for a LIGHTING ARRANGEMENT, filed on 4 Jan. 2016, now U.S. Pat. No. 9,921,364 issued 20 Mar. 2018. The '760 application claimed priority to U.S. Prov. Pat. App. Ser. 62/099,492. All of the applications identified above are hereby incorporated by reference in their entireties. The present application claims priority to all of the applications identified above.

BACKGROUND

1. Field

The present disclosure relates to structures operable to emit light.

2. Description of Related Prior Art

U.S. Pat. No. 8,376,777 discloses a QUICK MOUNTING DEVICE WITH MODULES. The quick mounting device for appliances is alleged to be quickly and easily engaged and disengaged mechanically without the use of tools. U.S. Pub. No. 2012/0187852A1 discloses an ELEVATOR EMERGENCY LED LIGHTING POWER SUPPLY ASSEMBLY. An elevator emergency LED lighting power supply assembly including an inverter that receives DC power from a battery and outputs backup power to LED lamps of an elevator lighting system. An LED driver is connected to the inverter, is connectable to an LED lamp of the elevator lighting system, receives AC power from the inverter, and outputs DC power sufficient to power an LED lamp. A relay is connected between the inverter and the LED driver, is connectable to a primary elevator electrical power supply, and allows AC power to flow from a primary elevator electrical power supply to elevator lighting system LEDs through the LED driver as long as AC power is available from a primary elevator electrical power supply. Upon loss of power from the primary elevator power supply the relay switches contacts and provides to the LED driver AC power received from the inverter.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A lighting arrangement includes a light emitter portion and a battery backup portion. The light emitter portion can have a plurality of light emitting diodes in an array string and circuitry for driving the plurality of light emitting diodes including a rectifier and an IC chip configured to drive the plurality of light emitting diodes with the rectified voltage provided by the rectifier. The light emitter portion can also have a trim wherein the plurality of light emitting diodes in the array string and the circuitry can be mounted on the trim. The battery backup portion can be in electronic communication with the rectifier of the light emitter portion and can have a battery portion with one or more batteries and a converter portion with a DC-AC inverter. The converter portion can be connected to the rectifier and can be configured to receive power from the one or more batteries or a primary AC source. The converter portion can include a microcontroller unit. The microcontroller unit can be configured to route AC power to the rectifier from either the primary AC source or the battery portion when the light emitter portion and the battery backup portion are engaged with one another. The light emitter portion can be configured to be mounted to at least one of a wall and a ceiling during use. The battery backup portion can be positioned within the trim, with the plurality of light emitting diodes in the array string.

BRIEF DESCRIPTION OF THE DRAWINGS

The detailed description set forth below references the following drawings:

FIG. 10 is a perspective view from a top perspective looking downward of a battery backup of the third exemplary lighting arrangement;

FIG. 11 is a perspective view from a bottom perspective looking upward of a battery backup of the third exemplary lighting arrangement;

DETAILED DESCRIPTION

Figure 1:
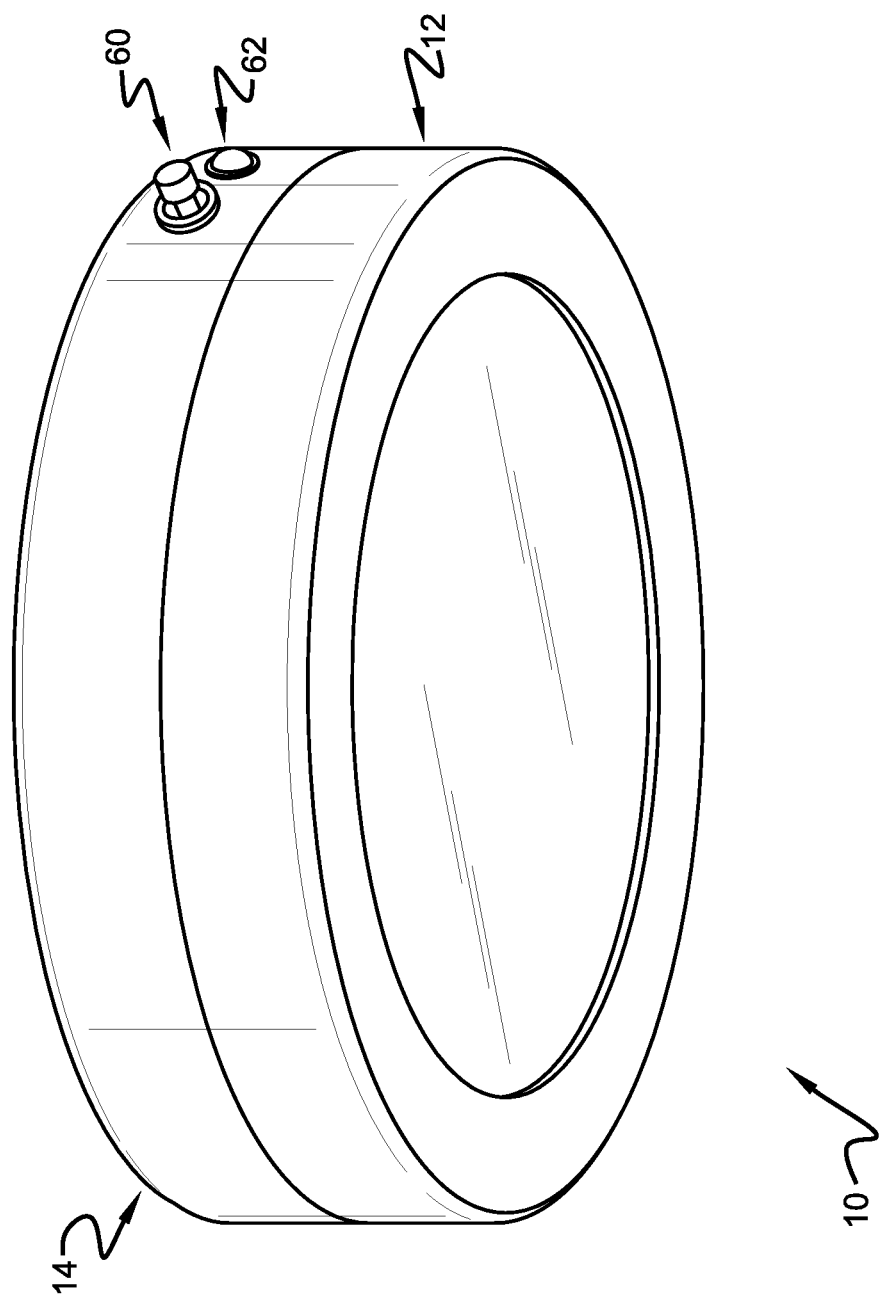
FIG. 1 a perspective view of a lighting arrangement having a battery backup for operation according to an exemplary embodiment of the present disclosure.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

Figure 2:
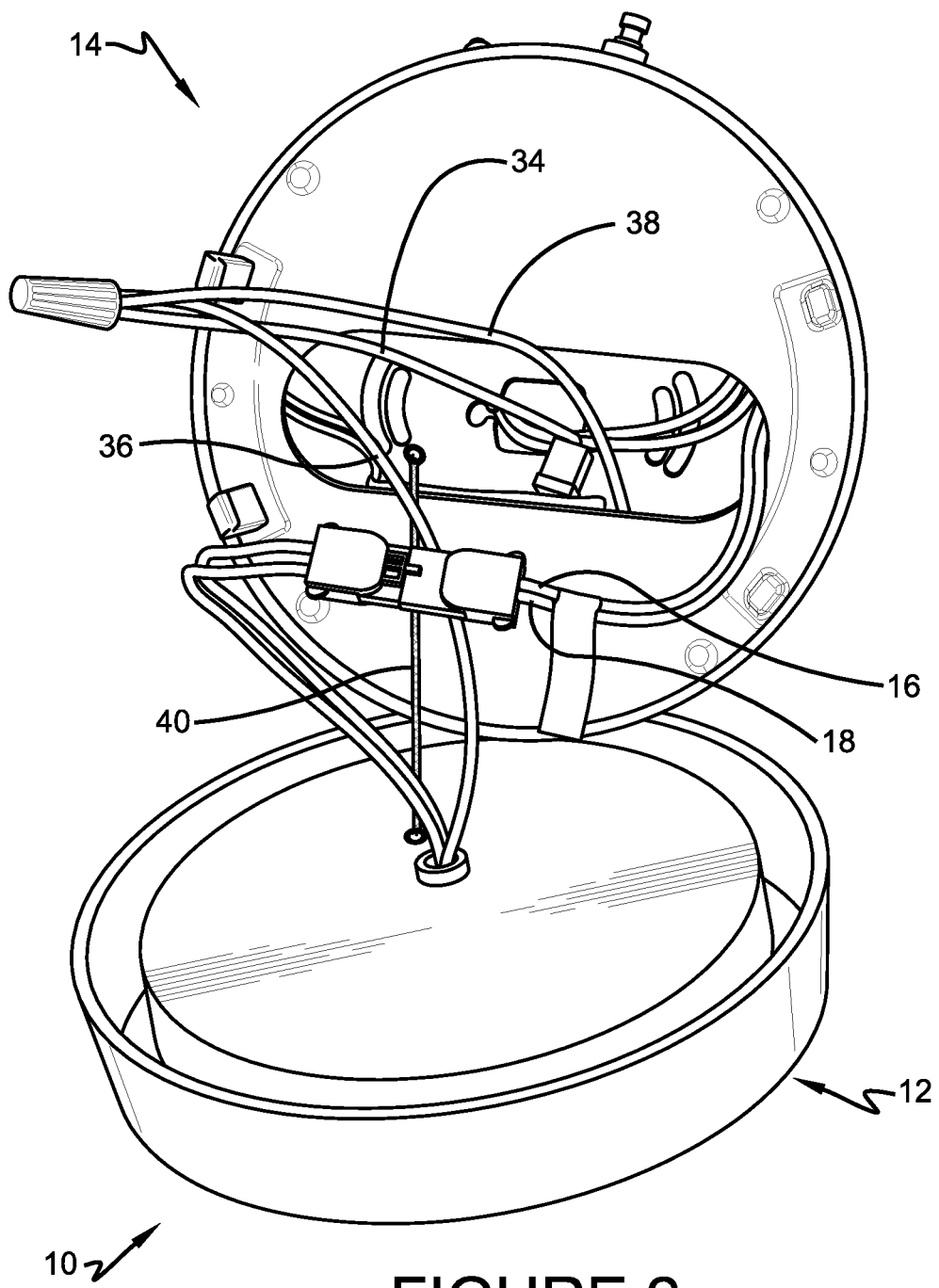
FIG. 2 is a perspective view of the lighting arrangement shown in FIG. 1 with a light emitter portion partially unattached from a battery backup portion.
Figure 3:
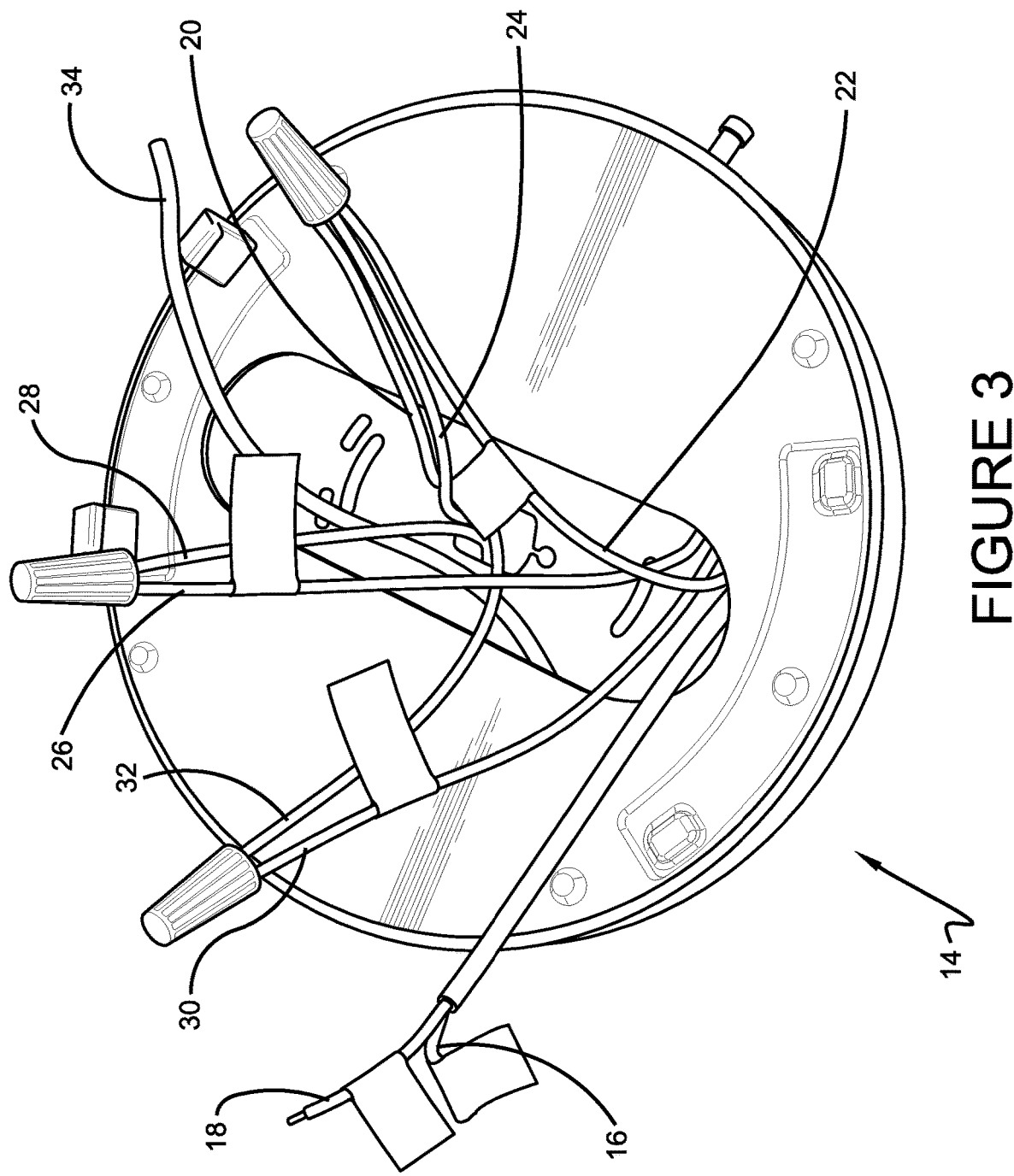
FIG. 3 is a perspective view of the battery backup portion of the lighting arrangement shown in FIGS. 1 and 2.
Figure 4:
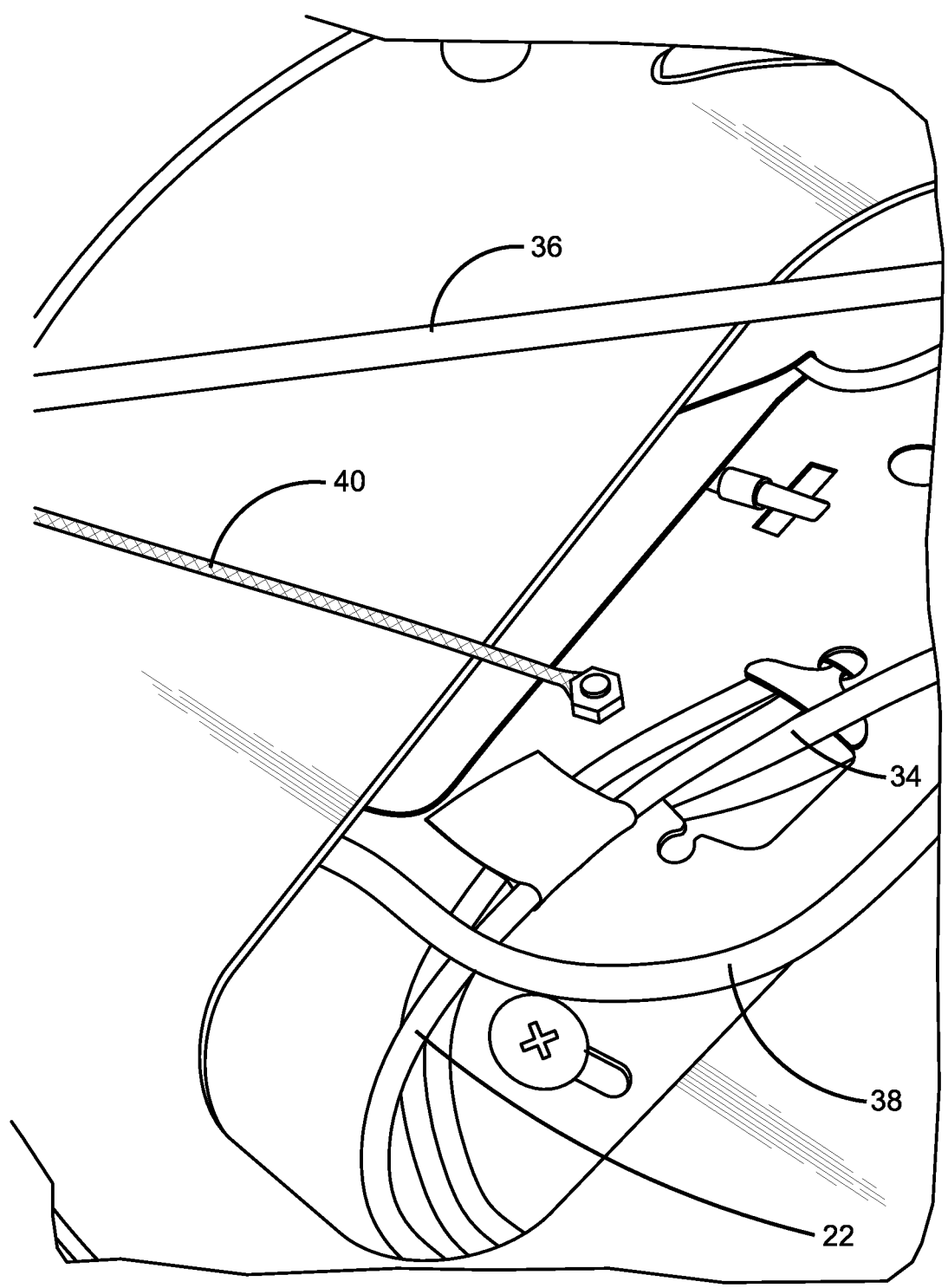
FIG. 4 is a magnified view of the structures shown in FIG. 3.

FIG. 1 is a perspective view of an exemplary lighting arrangement 10 according to the present disclosure. FIG. 2 is a perspective view of the lighting arrangement 10 shown in FIG. 1 with a light emitter portion 12 partially attached to a battery backup portion 14. FIG. 3 is a perspective view of the battery backup portion 14 of the lighting arrangement shown in FIGS. 1 and 2. FIG. 4 is a magnified view of the battery backup portion 14. The circuit schematic shown in FIG. 5 is applied in the embodiment.

In FIG. 3, leads 16, 18 can extend to an LED array of the light emitter portion 12 from the battery backup portion 14. Leads 20, 22, and 24 can define a neutral connection. Leads 26, 28, can define a continuous, un-switched connection to the LED array of the light emitter portion 12 through the lead 18. AC from a standard, primary or regular or non-emergency source can be supplied to the LED array of the light emitter portion 12 through leads 18, 26, 28. Leads 30, 32, can define a switched connection to the LED array of the light emitter portion 12 through the lead 18. AC from a battery of the battery backup portion 14 can be supplied to the LED array of the light emitter portion 12 through leads 18, 30, 32 when the standard or regular or non-emergency source has failed. Lead 34 can define a ground connection. A ground 36 from the LED array of the light emitter portion 12 and a ground 38 from the standard or regular or non-emergency source can be spliced to the ground lead 34.

The battery backup portion 14 can allow the light emitter portion 12 to function as it would function under the standard or regular or non-emergency source. The light emitter portion 12 can be fully functional, including dimmable. The battery backup portion 14 can be mounted directly to a junction box. When the leads have been connected, the leads can be arranged inside the battery backup portion 14. The battery backup portion 14 can be connected to the light emitter portion 12 through a safety wire 40. The safety wire 40 can ease installation and prevent completion separation of the light emitter portion 12 from the battery backup portion 14. The battery backup portion 14 can also include a test circuit with a push test button, referenced at 60 in FIG. 1. The LED 62 and the test button 60 are mounted in the battery backup portion 14. When the button 60 is pressed, an LED 62 will be powered by the battery backup portion 14 if the battery backup portion 14 has power.

Figure 5:
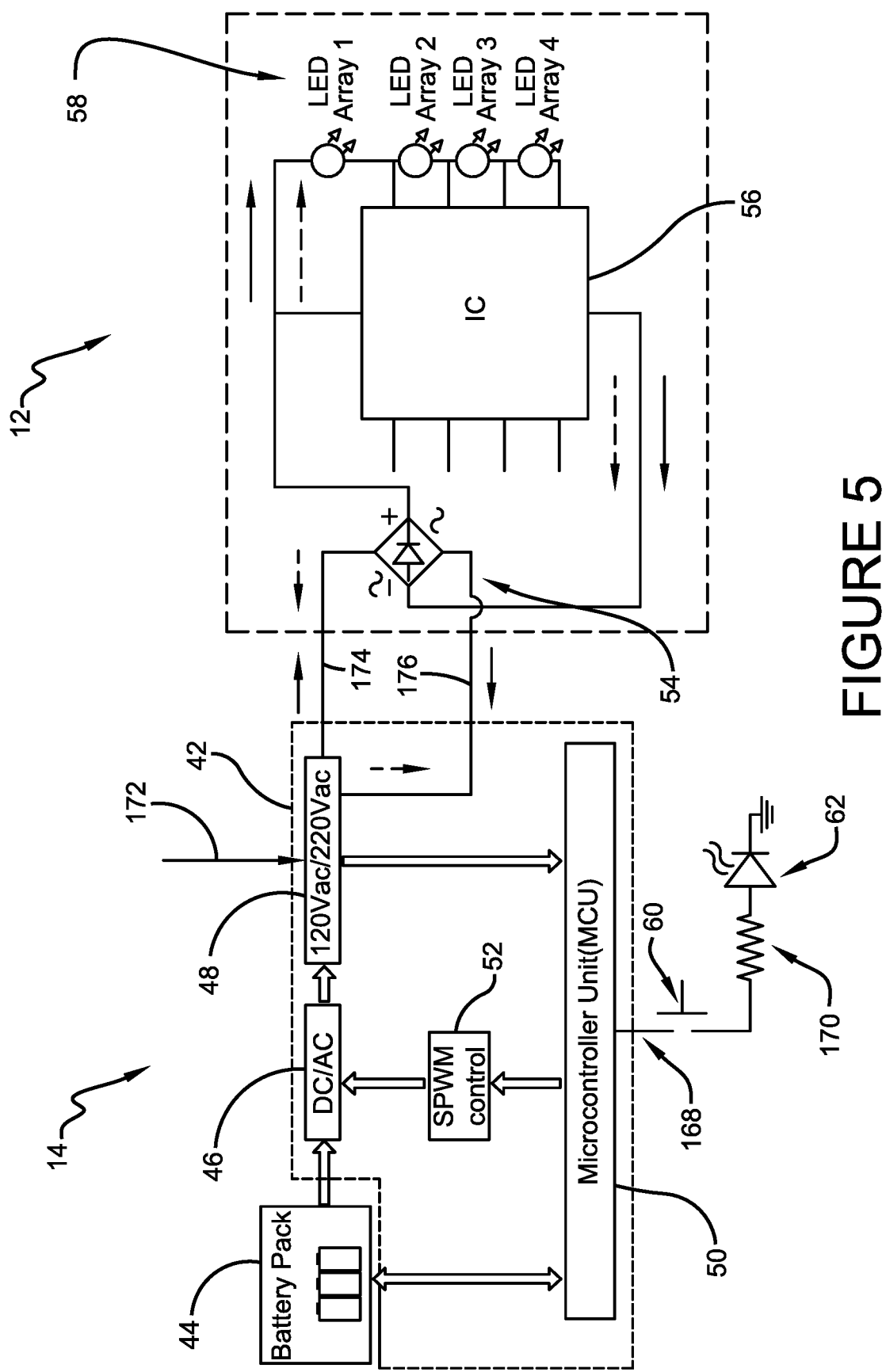
FIG. 5 is a circuit schematic of the circuit incorporated in the lighting arrangement shown in FIGS. 1-4.

FIG. 5 is a circuit schematic according to an exemplary embodiment of the present disclosure. The exemplary embodiment shown in FIG. 5 provides a driver circuit for the light emitter portion 12 shown in FIGS. 1-4. A prior art driver circuit is a relatively large structure, but the exemplary embodiment can provide a chip mounted on the light emitter portion 12. The chip can tightly control voltage fluctuations. As a result, a battery for powering the light emitter portion 12 during an outage can be smaller in terms of physical size or power rating than would otherwise be required.

The battery backup portion 14 can include converter portion 42 and a battery portion 44. The converter portion 42 can be operably disposed between the battery portion 44 and the light emitter portion 12. The converter portion 42 can itself be powered by the battery portion 44. The battery portion 44 can have any desired physical size. The battery portion 44 can be defined by a single battery or an array of batteries connected in series or in parallel. By way of example and not limitation, the battery portion 44 can include one or more Samsung® Model ICR18650-26F batteries, each having a length of sixty-five millimeters and a diameter of eighteen and four-tenths millimeters. This yields a volume of seventeen-thousand two-hundred and eighty-four cubic millimeters. The battery portion 44 can be rated at 3.8 volts, 2600 mAh and have a capacity is 9.88 Wh after being charged. In one embodiment of the present disclosure, three batteries can be connected in series having a volume of fifty-one-thousand eight-hundred and fifty-one cubic millimeters.

The converter portion 42 can include a DC-AC converter 46. The DC-AC converter 46 can be a functional group that includes a plurality of components such as a transistor, diode, capacitor, and transformer. The DC-AC converter 46 can convert relatively low DC voltage from the battery portion 44 into AC voltage. The box 48 simply refers to the output of the converter portion 42.

The converter portion 42 can also include a microcontroller unit 50. The microcontroller unit 50 can include voltage dividers, amplifiers, RAM, a timer, A/D, PWM, and other integrated functions. In one or more embodiments of the present disclosure, the microcontroller unit 50 can include an enhanced 8051 series MCU, such as a SH79F081A provided by Sino Wealth, alongside voltage dividers and amplifiers that enable the high voltages and currents to be measured by the A/D.

The converter portion 42 can also include a sinusoidal pulse-width modulation (SPWM) module 52. The SPWM module 52 can be integral with the microcontroller unit 50. The SPWM module 52 can generate a sinusoidal modulated pulse in response to a control signal emitted by the microcontroller unit 50 to SPWM module 52. The pulse can be utilized to control the ON/OFF status of a transistor of the converter 46, such as a MOSFET. When the transistor is open, the converter portion 42 can be engaged to communicate AC power to a rectifier 54. The microcontroller unit 90 can be arranged to monitor the delivery of AC power to the light emitter portion 12 from a primary source of power, such as the grid. When the primary or main electrical power is off due to an emergency, or power outage, or some other condition, the microcontroller unit 50 can emit the pulse to engage the other portions of the converter portion 42 and supply power to the light emitter portion 12.

The battery portion 44 and converter portion 42 can define an emergency back-up to the light emitter portion 12. The battery portion 44 and converter portion 42 can be formed as an integral battery backup portion 14 that can be attached to the junction box delivering electrical power to the light emitter portion 12. Wire nuts can connect the three (3) wires available for connection into junction box.

In one or more exemplary embodiments, the battery portion 44 can provide thirty watt-hours of power. When supporting a twenty watt light emitter portion 12 (or fixture), the battery portion 44 can thus provide power for one and a half hours. The power can be provided almost instantaneously; when power is lost from the standard or regular or non-emergency source, the micro-controller 50 can engage the inverter circuit 46 to supply 120V, AC power to the light emitter portion 12.

The output signal of the converter portion 42 is directed through the bridge rectifier 54. The signal can be received by an IC chip 56. The light emitter portion 12 can control individual LEDs of an LED array string 58 based on the input voltage. The quantity of LEDs can be variable. Unlike a traditional arrangement, the light emitter portion 12 can be configured to drive the IC chip 56 directly in relatively high voltage rectified AC mode and not to transform relatively high voltage rectified AC to low voltage DC. IC chip 56 is configured to provide device appropriate current flow into the LED array string 58. Many different step-IC chips can be utilized in various embodiments of the present disclosure, depending on different functions that may be desired, such as dimming or particular color dimming for differently colored LEDs. One example of a step-IC that can be utilized in one or more embodiments of the present disclosure for the IC chip 56 is a MAP9001 supplied by MagnaChip Semiconductor. The MAP9001 has the ability to accept voltages between 90V and 270V rectified voltage.

A connection to the grid is referenced at 172. AC from the rectifier 54 can pass to the rectifier 54 from the box 48 along line 174. AC from the rectifier 54 can return to the box 48 along line 176 (neutral). The power flow is illustrated with solid and dashed arrows. Because the AC is rectified there are two half cycles. In the positive half cycle (solid arrows), the power flows from line 174, through the rectifier 54, and out of the terminal marked (+), around to the LED string 58, through the chip 56, back through the rectifier 54, and then to neutral 176. During the negative half cycle (dashed arrows), the power flows from neutral 174, through the rectifier 54, out of the terminal marked (+), through the LED string 58, through the chip 56, back through the rectifier 54, and then through the line 174.

The arrangement described above results in the unexpected benefit of a smaller backup battery along with the number of light emitting diodes (LEDs) being variable based on the battery voltage.

FIG. 5 illustrates one approach to connecting the button 60 and LED 62 to the circuit. The microcontroller 50 can be measuring/monitoring the voltage of the battery portion 44. The microcontroller 50 can include an output referenced at 168 that is connected to the LED 62 through the switch 60 and a resistor 170. The microcontroller 50 can be configured to turn on the output 168 when the battery portion 44 is charged; thus, when the user presses the button 60, the LED 62 would illuminate. If the battery portion 44 were not charged, the output 168 would be off and pressing the button 60 not cause the LED 62 to illuminate.

In the first exemplary embodiment, the battery backup portion 14 and the light emitter portion 12 are fixed directly together. Also, the exemplary light emitter portion 12 and the exemplary battery backup portion 14 have substantially the same outer profile, as shown in FIG. 1. The exemplary light emitter portion 12 and the exemplary battery backup portion 14 can thus both be exposed after installation without aesthetic concerns. The exemplary light emitter portion 12 and the exemplary battery backup portion 14 can be mounted on a ceiling or on a wall, both visible.

Figure 6:
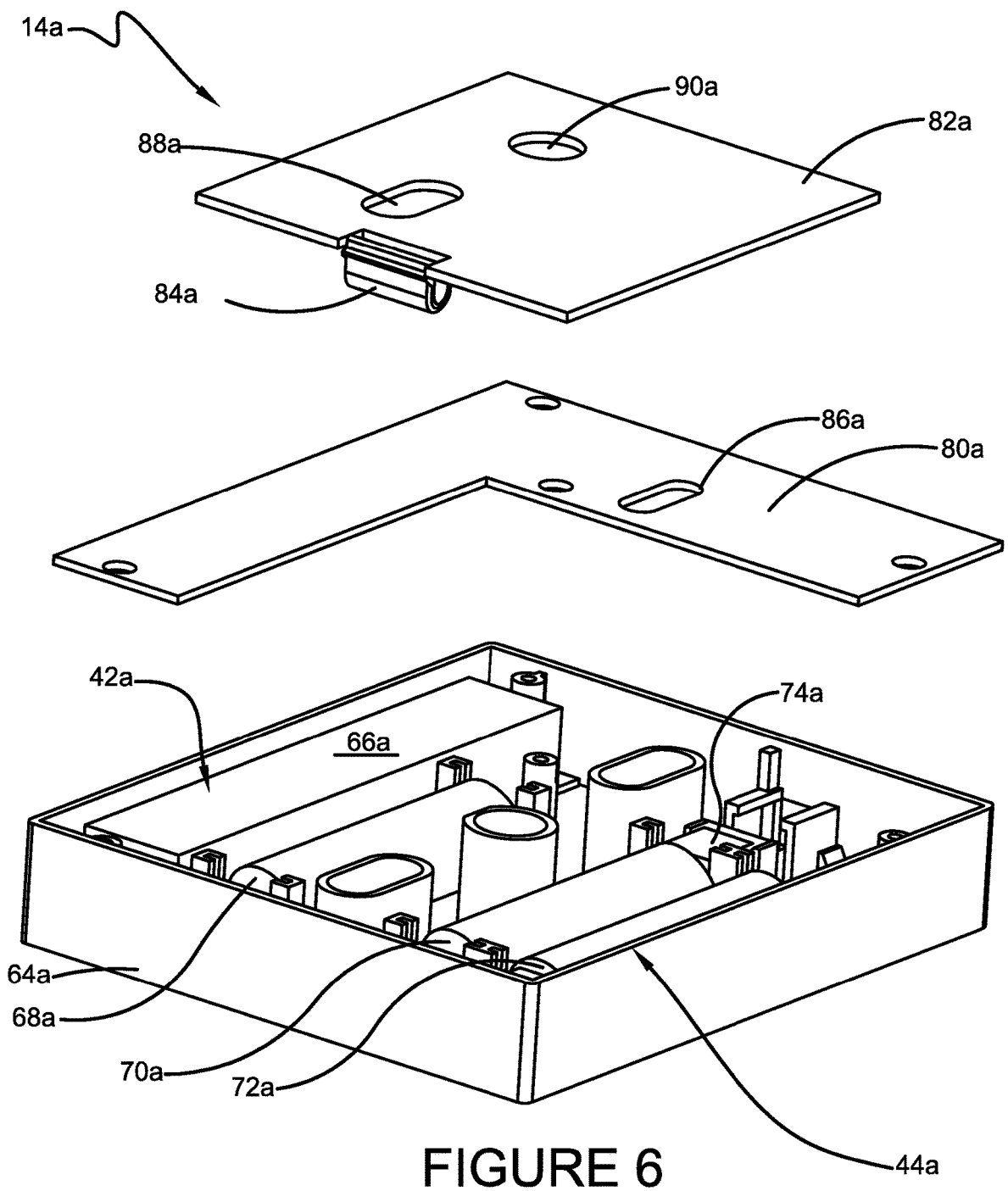
FIG. 6 is an exploded view of a second exemplary battery backup according to one or more implementations of the present disclosure.
Figure 7:
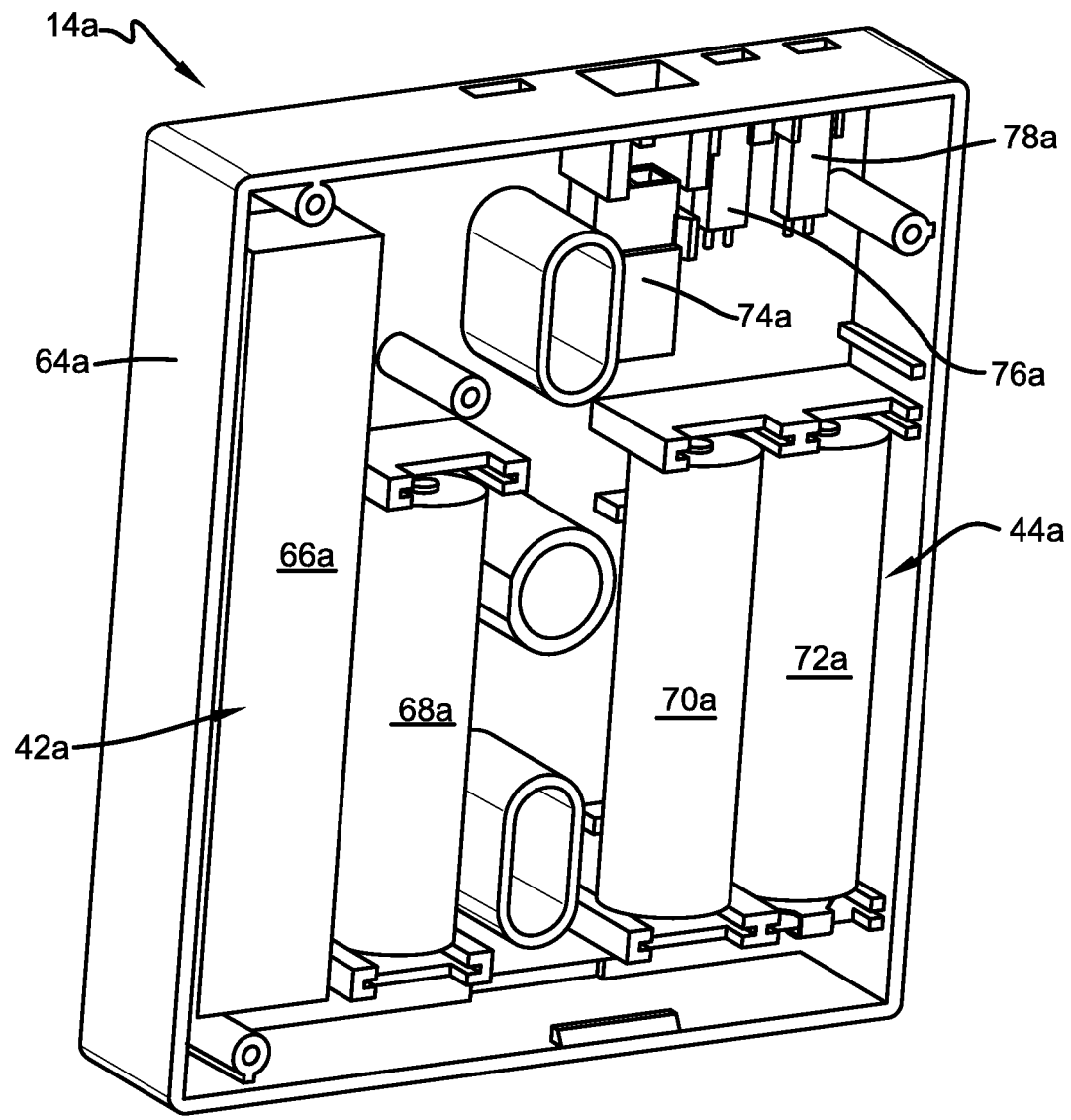
FIG. 7 is a rear perspective view of the second exemplary battery backup shown in FIG. 6 with covers removed to show internal structures.
Figure 8:
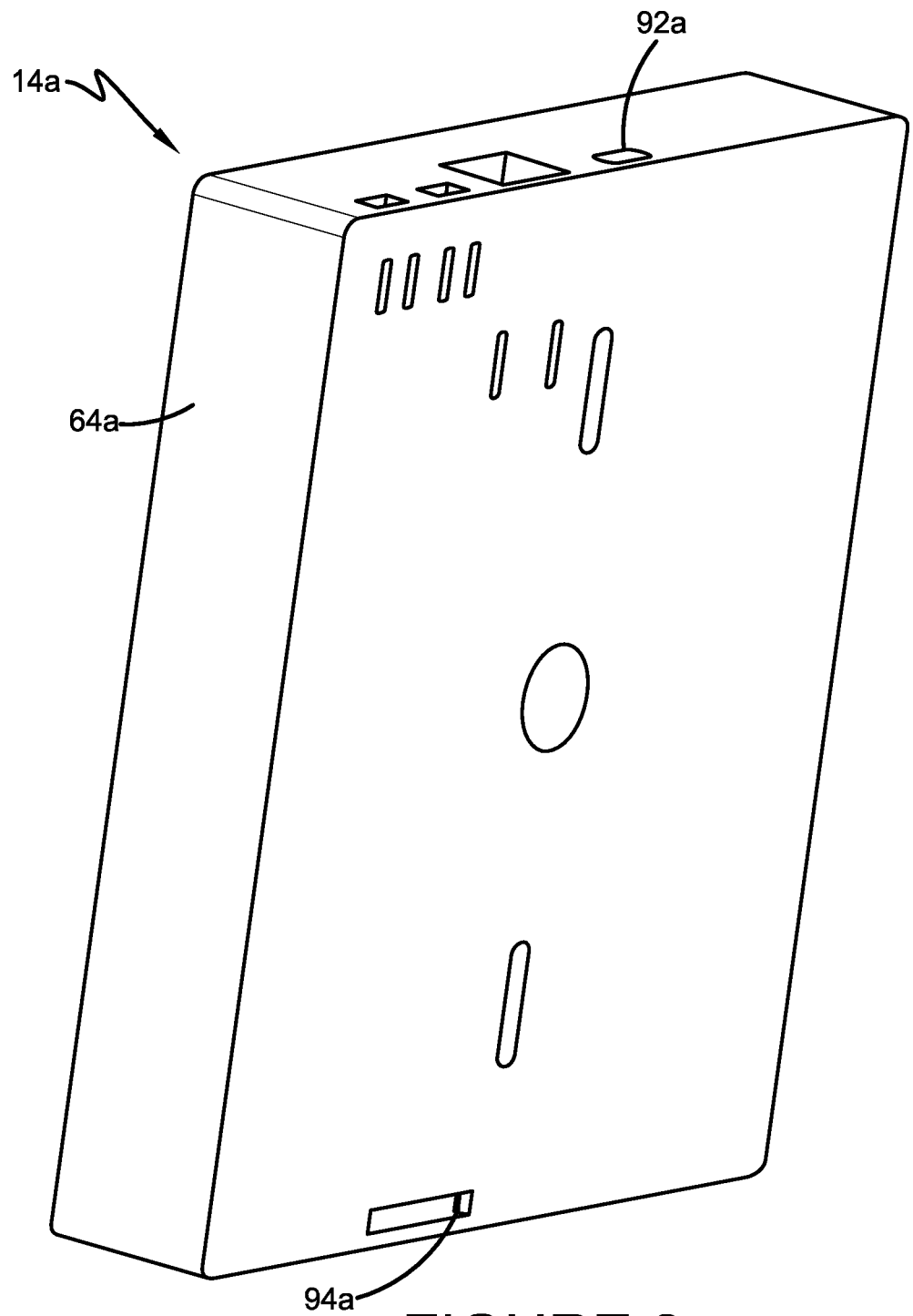
FIG. 8 is a front perspective view of the second exemplary battery backup shown in FIG. 6.
Figure 9:
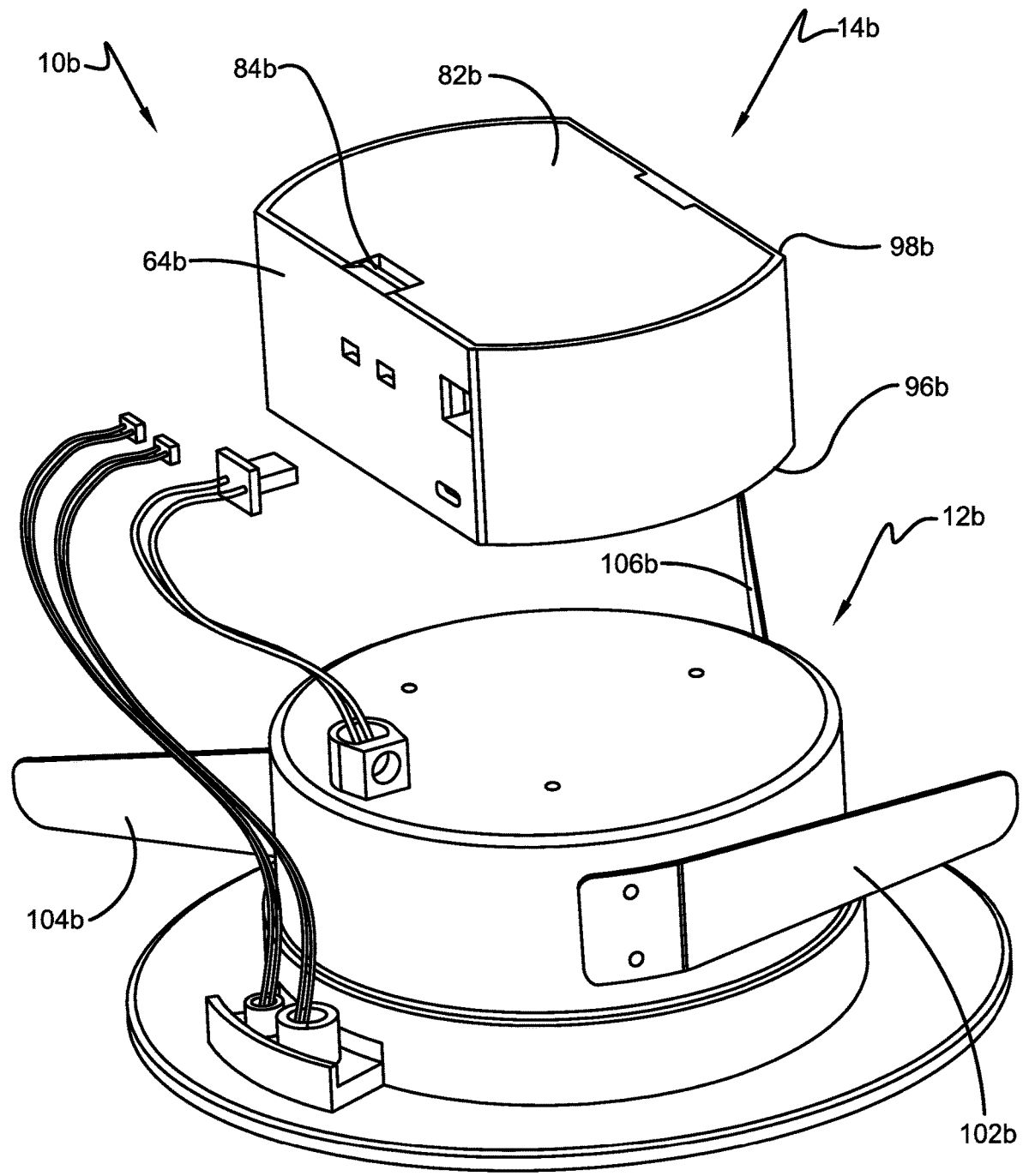
FIG. 9 is an exploded view of a third exemplary lighting arrangement according to one or more implementations of the present disclosure.
Figure 12:
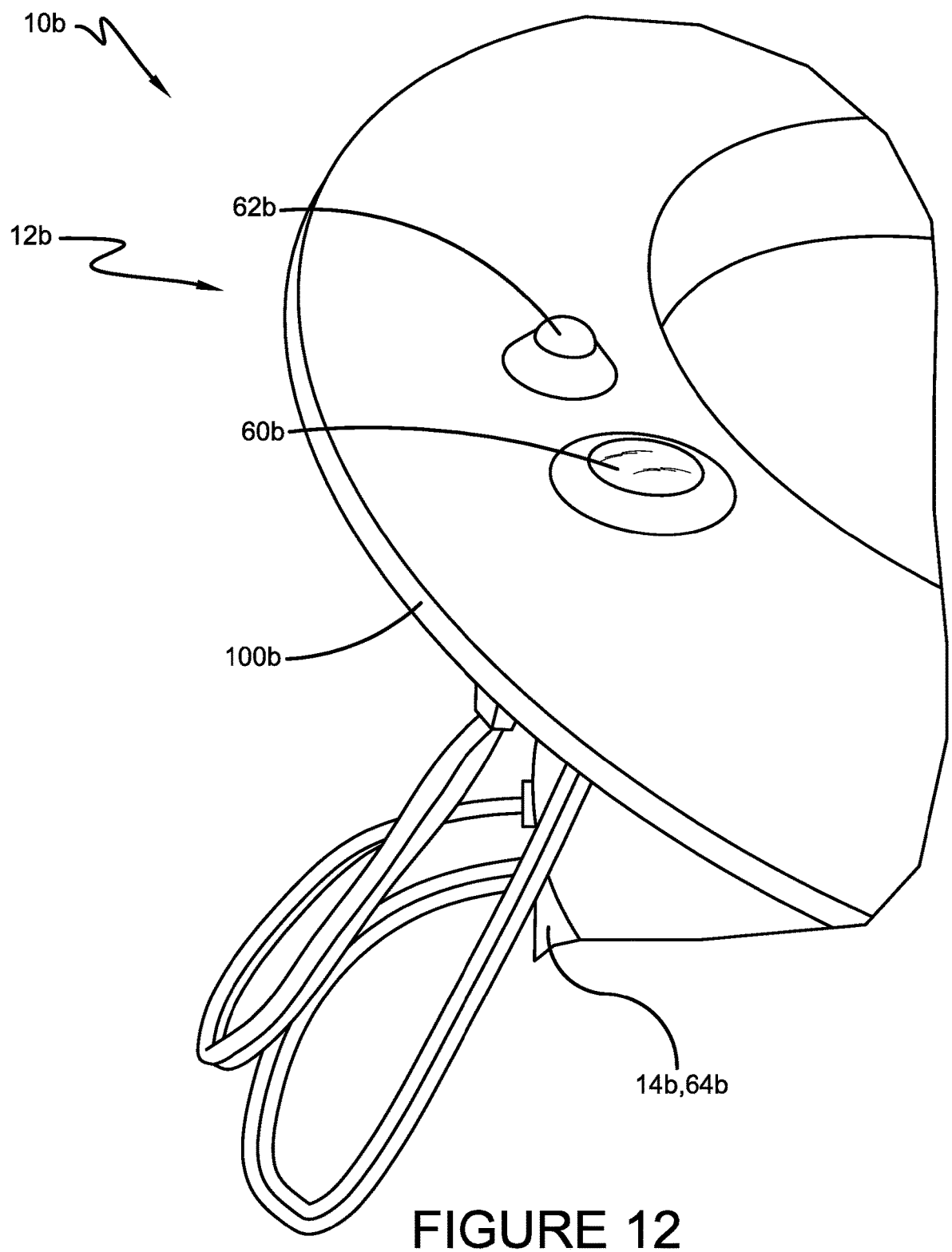
FIG. 12 is a side perspective view of the third exemplary lighting arrangement looking across a light emitter portion.

The first exemplary battery backup portion 14 is circular. FIGS. 6-8 are of a second exemplary battery backup portion 14a. The second exemplary battery backup portion 14a is square and can be exposed after installation without aesthetic concerns and mounted directly to a light emitter, similar to the first exemplary battery backup portion 14. The second exemplary battery backup portion 14a can be utilized with a wall sconce. The second exemplary battery backup portion 14a can include a case 64a. A converter portion 42a and a battery portion 44a can be positioned in the case 64a. The exemplary converter portion 42a is shown as a subcase 66a ; the circuitry of the converter portion 42a is disposed within the subcase 66a. The schematic of FIG. 5 is applicable to the lighting arrangement 10a.

The exemplary battery portion 44a includes batteries 68a, 70a, 72a. The second exemplary battery backup portion 14a can also include a plug 74a for interconnecting electronically with a light emitter portion (not shown), a plug 76a for interconnecting electronically with a test LED such as LED 62 (not shown), and a plug 78a for interconnecting electronically with a test button such as test button 60 (not shown). Apertures are defined in the exemplary case 64a for receiving mating plugs. It is noted that wiring among the various components is not shown to enhance the clarity of the other structures, but the batteries 68a, 70a, 72a, the converter portion 42a, and the plugs 74a, 76a, 78a are electronically connected with one another through wiring.

The second exemplary battery backup portion 14a can also include a cover 80a to enclose the converter portion 42a and the plugs 74a, 76a, 78a in the case 64a. The second exemplary battery backup portion 14a can also include a door 82a. The door 82a can be selectively opened and closed with a clip 84a. When the door 82a is closed, the batteries 68a, 70a, 72a are enclosed in the case 64a. The cover 80a and door 82a can include one or more apertures such as apertures 86a, 88a, 90a for receiving mounting hardware projecting from a wall. The case 64a can include apertures such as apertures 92a, 94a for receiving tabs associated with a light emitter to hang the light emitter on the case 64a.

FIGS. 9-12 are of an embodiment of the present disclosure that is a recessed lighting arrangement 10b. The lighting arrangement 10b includes a light emitter portion 12b having a plurality of light emitting diodes and circuitry for driving the plurality of light emitting diodes including a rectifier and an IC chip downstream of the rectifier. The lighting arrangement 10b also includes a battery backup portion 14b in electronic communication with the light emitter portion 12b and having a battery portion with one or more batteries and a converter portion with a DC-AC inverter downstream of the one or more batteries that directs the electrical signal to the rectifier and is driven by the one or batteries. The schematic of FIG. 5 is applicable to the lighting arrangement 10b.

The third exemplary battery backup portion 14b is generally cubic and can be mounted directly to the light emitter 12b, similar to the first and second exemplary battery backup portions 14, 14a. The third exemplary battery backup portion 14b can include a case 64b. The exemplary case 64b extends from a bottom edge 96b to a top edge 98b. A converter portion 42b and a battery portion 44b can be positioned in the case 64b. The exemplary converter portion 42b is shown as a subcase 66b, as best shown in FIG. 11. The circuitry of the converter portion 42b is disposed within the subcase 66b. The schematic of FIG. 5 is applicable to the lighting arrangement 10b.

The exemplary battery portion 44b includes batteries 68b, 70b. The third exemplary battery backup portion 14b can also include a plug 74b for interconnecting electronically with the light emitter portion 12b, a plug 76b for interconnecting electronically with a test LED 62b, and a plug 78b for interconnecting electronically with a test button 60b. The light emitting diode 62b and the test button 60b are mounted in a flange portion 100b of the light emitter portion 12b. Apertures are defined in the exemplary case 64b for receiving mating plugs. It is noted that wiring among the various components is not shown to enhance the clarity of the other structures, but the batteries 68b, 70b, the converter portion 42b, and the plugs 74b, 76b, 78b are electronically connected with one another through wiring.

The third exemplary battery backup portion 14b can also include a door 82b to enclose the converter portion 42b, the plugs 74b, 76b, 78b, and the battery portion 44b in the case 64b. The door 82b can be selectively opened and closed with a clip 84b. When the door 82b is closed, the batteries 68b, 70b are enclosed in the case 64b. The lighting arrangement 10b can also include fins/springs 102b, 104b, 106b for mounting the lighting arrangement 10b in a hole in a ceiling.

FIGS. 13-16 are of an embodiment of the present disclosure that is a lighting arrangement 10c that can be mounted on a surface exposed in a dwelling space, such as a ceiling or a wall. The lighting arrangement 10c includes a light emitter portion 12c having a plurality of light emitting diodes 108c and circuitry (referenced generally at 110c) for driving the plurality of light emitting diodes 108c including a rectifier and an IC chip downstream of the rectifier. The lighting arrangement 10c also includes a battery backup portion 14c in electronic communication with the light emitter portion 12c and having a battery portion with one or more batteries and a converter portion with a DC-AC inverter downstream of the one or more batteries that directs the electrical signal to the rectifier and is driven by the one or batteries. The schematic of FIG. 5 is applicable to the lighting arrangement 10c.

Figure 16:
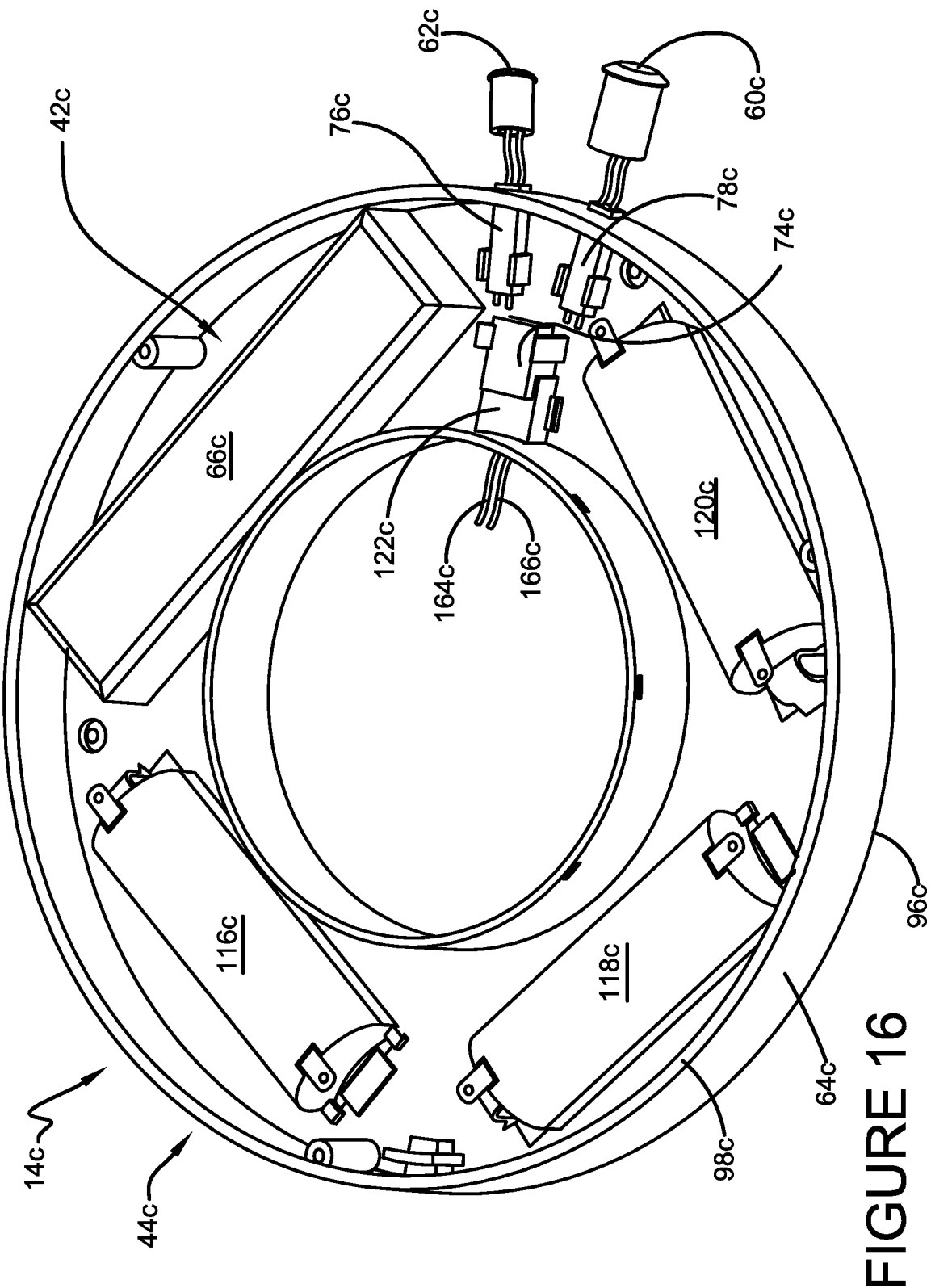
FIG. 16 is a perspective view from a top perspective looking downward of a battery backup portion of the fourth exemplary lighting arrangement with a top wall removed to show internal structures.
Figure 17:
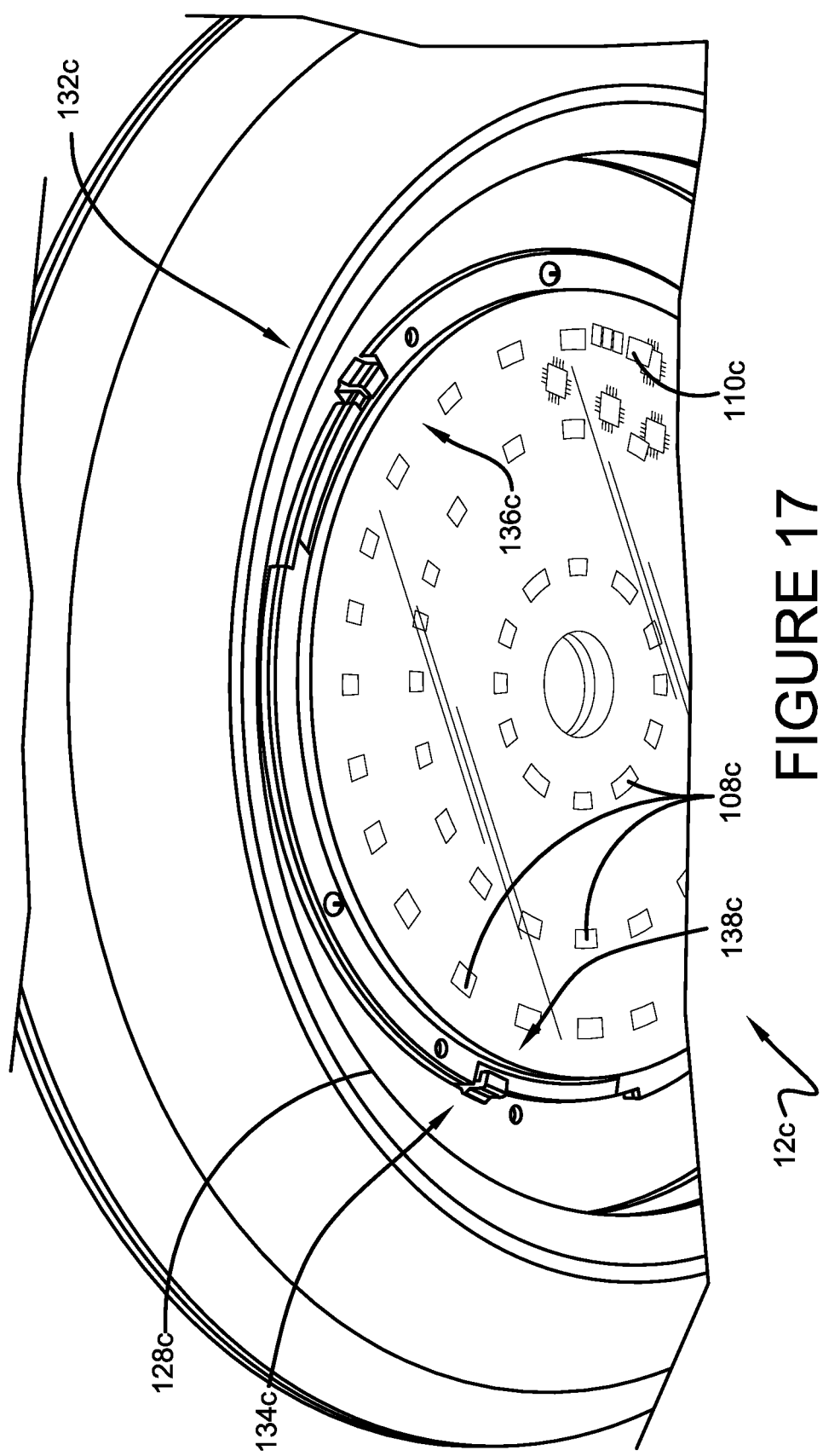
FIG. 17 is a magnified portion of FIG. 14.

The light emitter portion 12c and the battery backup portion 14c are centered on a longitudinal axis 112c. The third exemplary battery backup portion 14c is generally ring or donut-shaped. The third exemplary battery backup portion 14c can include a case 64c. The exemplary case 64c extends from a bottom edge 96c to a top edge 98c and can include a top wall 114c. A converter portion 42c and a battery portion 44c can be positioned in the case 64c. The exemplary converter portion 42c is shown as a subcase 66c, as best shown in FIG. 16. The circuitry of the converter portion 42c is disposed within the subcase 66c. The schematic of FIG. 5 is applicable to the lighting arrangement 10c.

The exemplary battery portion 44c includes batteries. In FIG. 16, the case 64c is shown having pockets 116c, 118c, 120c for receiving batteries. The perspective of FIG. 16 is from the top of the battery backup portion 14c, looking down. The openings of the pockets 116c, 118c, 120c for receiving the batteries is on the underside of the case 64c and therefore not visible in FIG. 16. The third exemplary battery backup portion 14c can also include a plug 74c for interconnecting electronically with the light emitter portion 12c. A plug from the light emitter 12c is referenced at 122c. The third exemplary battery backup portion 14c can also include a plug 76c for interconnecting electronically with a test LED 62c. The third exemplary battery backup portion 14c can also include a plug 78c for interconnecting electronically with a test button 60c. Apertures are defined in the exemplary case 64c for permitting passage of the plugs 76c, 78c. It is noted that wiring among the various components is not shown to enhance the clarity of the other structures, but the batteries, the converter portion 42c, and the plugs 74c, 76c, 78c are electronically connected with one another through wiring.

The fourth exemplary battery backup portion 14c can also include doors 82c, 124c, 126c to enclose the pockets 116c, 118c, 120c that receive the batteries. Each door 82c, 124c, 126c can be selectively opened and closed with a respective clip, such as clip 84c of door 82c. When the doors 82c, 124c, 126c are closed, the batteries are enclosed in the case 64c.

The lighting arrangement 10c further comprises a pan or trim 128c at least partially positioned between the light emitter portion 12c and the battery backup portion 14c along the longitudinal axis 112c. The electronic communication between the light emitter portion 12c and the battery backup portion 14c occurs through wires extending through an aperture 162c in the trim 128c, such as wires referenced at 164c, 166c. The trim 128c extends radially beyond the light emitter portion 12c relative to the longitudinal axis 112c and is configured to shield the battery backup portion 14c from light emitted by the light emitter portion 12c. The trim 128c can be mounted to a junction box or to the ceiling or wall, directly or with a bracket. The battery backup portion 14c can be mounted to the light emitter 12c through the trim 128c, as will be described in greater detail below. The light emitting diode 62c and the test button 60c can be mounted in a flange portion 130c of the trim 128c. The trim 128c includes apertures, such as apertures 158c, 160c, aligned with the doors 124c, 126c such that the doors 124c, 126c are exposed through the apertures 158c, 160c, allowing the batteries to be replaced without removing the trim 128c from the ceiling or wall. It is noted that the trim 128c can include an aperture aligned with door 82c as well.

Figure 18:
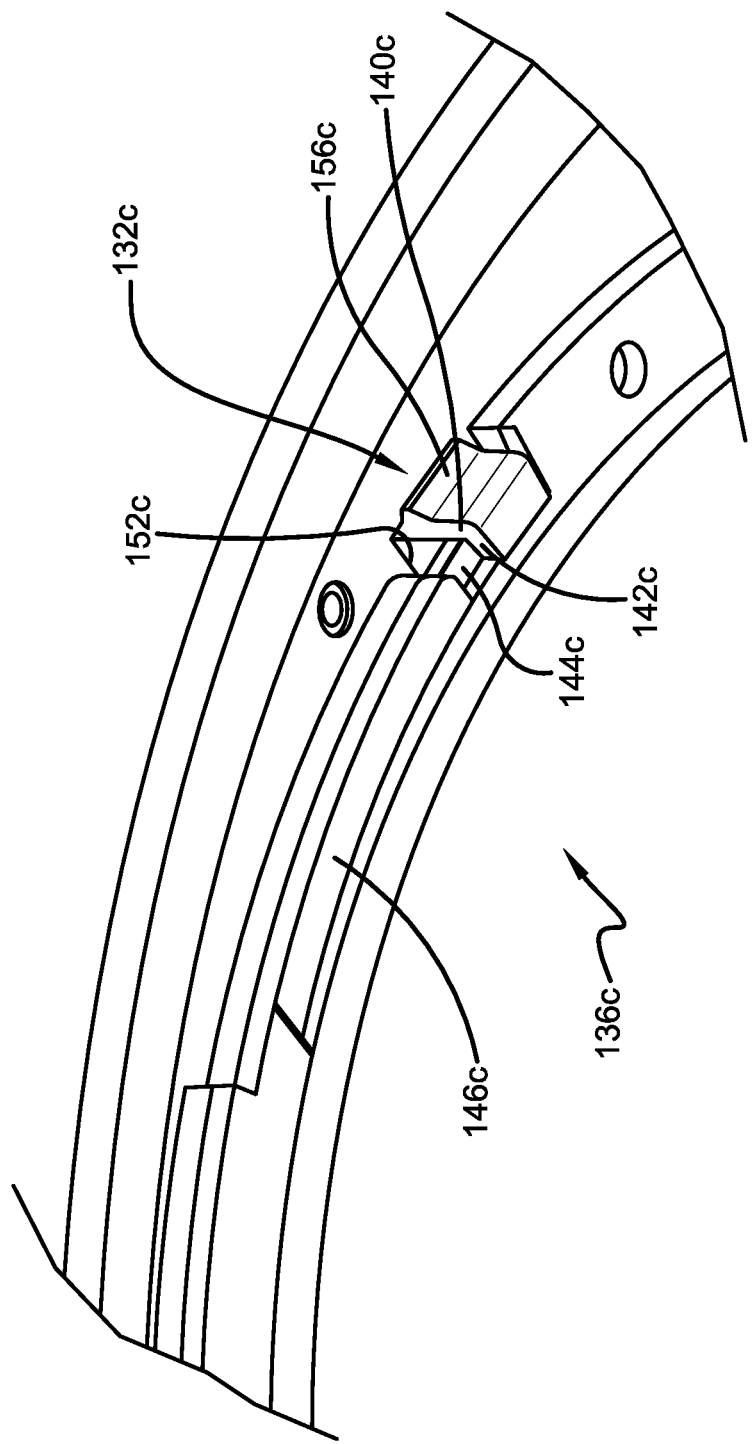
FIG. 18 is a magnified portion of FIG. 17.
Figure 19:
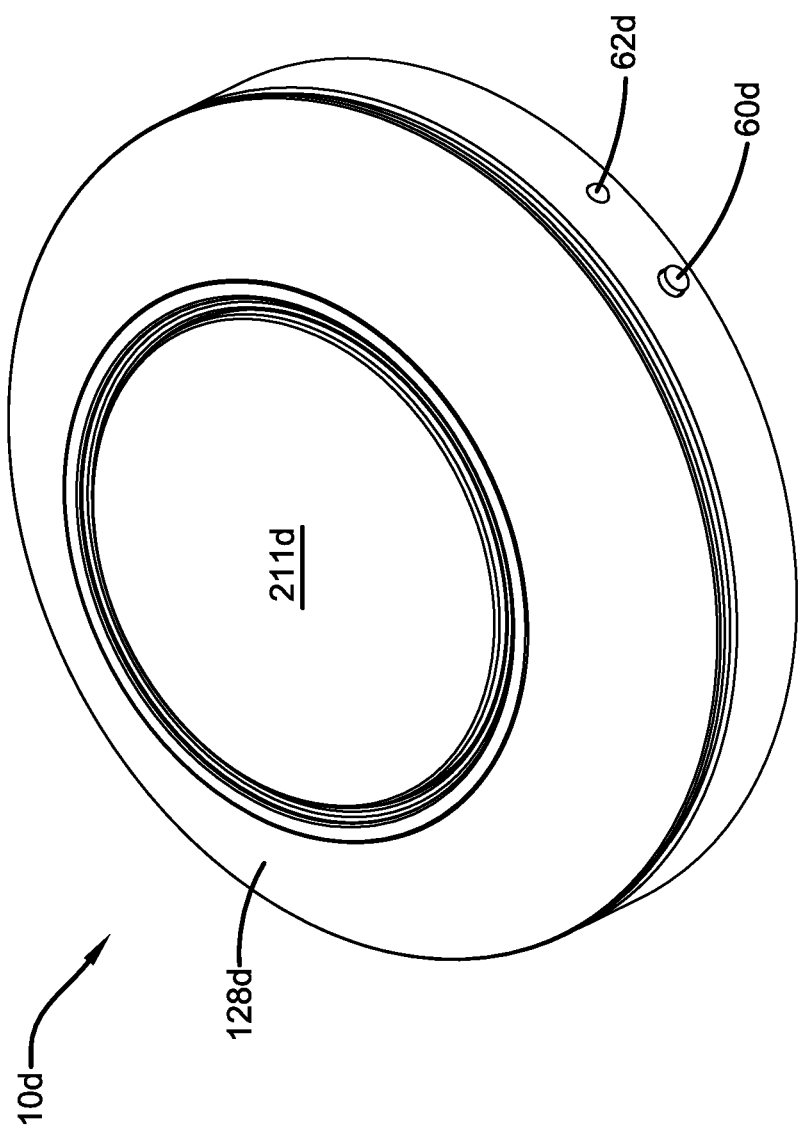
FIG. 19 is a perspective view of a fifth exemplary embodiment according to one or more implementations of the present disclosure.

The lighting arrangement 10 also includes a plurality of locking arms such as locking arms 132c, 134c and a plurality of circumferential notches such as circumferential notches 136c, 138c. The plurality of locking arms 132c, 134c can each be fixedly associated with the battery backup portion 14c. Each of the plurality of locking arms 132c, 134c can include an axial portion extending along the longitudinal axis 112c and a radial portion extending perpendicular to the longitudinal axis 112c. In FIG. 18, the exemplary locking arm 132c includes an axial portion 140c and a radial portion 142c. Each of the radial portions extends from a first end at an intersection with one of the axial portions to a respective second end distal relative to the first end.

Figure 13:
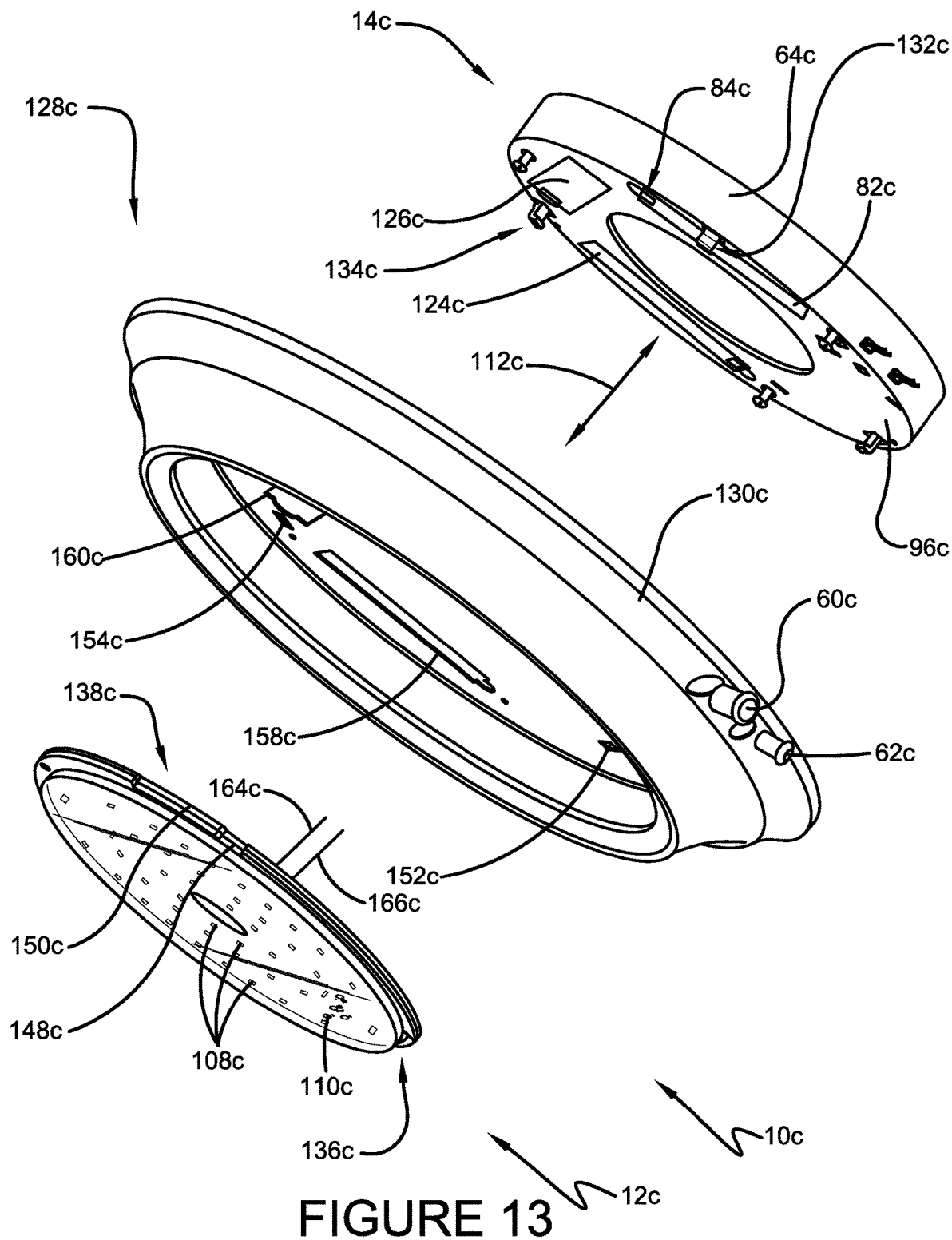
FIG. 13 is an exploded view of a fourth exemplary lighting arrangement according to one or more implementations of the present disclosure.
Figure 14:
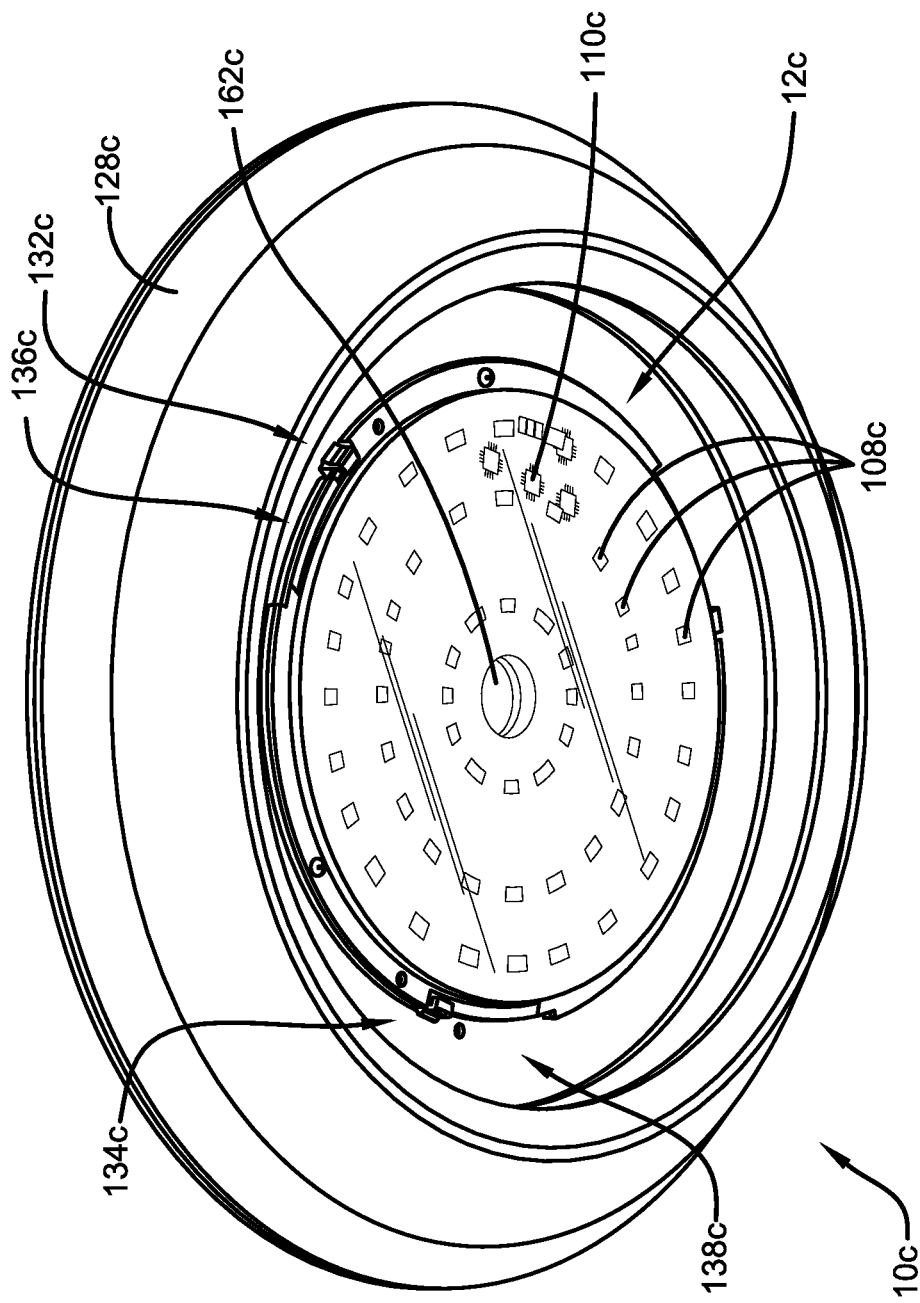
FIG. 14 is a perspective view from a bottom perspective looking upward of the fourth exemplary lighting arrangement.
Figure 15:
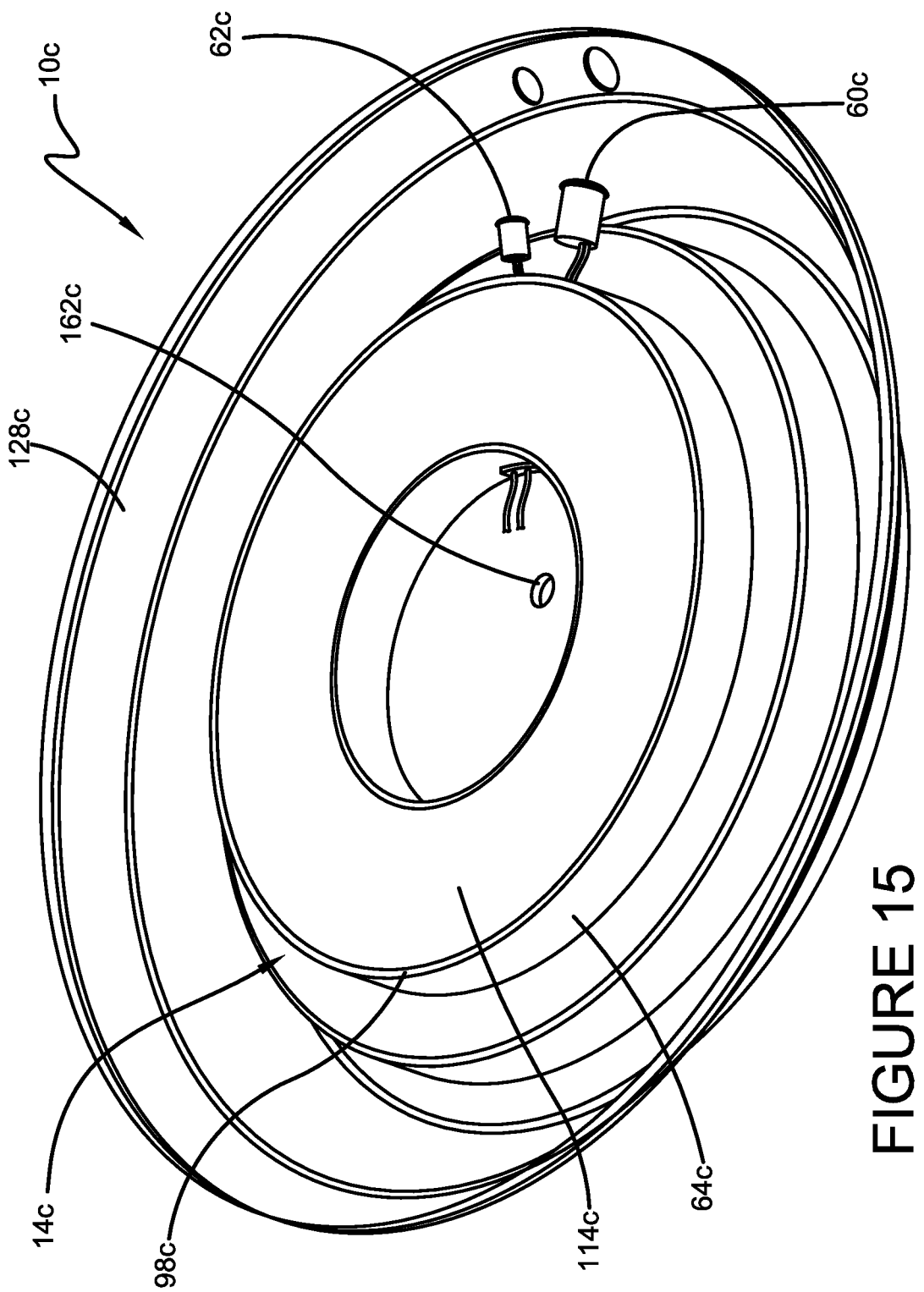
FIG. 15 is a perspective view from a top perspective looking downward of the fourth exemplary lighting arrangement.

Each of the plurality of exemplary circumferential notches 136c, 138c is defined in the light emitter portion 12c. Each of the plurality of circumferential notches 136c, 138c extends about the longitudinal axis 112c and defines a gap portion and a ledge portion. In FIG. 18, the exemplary circumferential notch 136c includes a gap portion 144c and a radial portion 146c. In FIG. 13, the exemplary circumferential notch 138c includes a gap portion 148c and a radial portion 150c.

The battery backup portion 14c and the trim 128c can be interconnected by passing the locking arms 132c, 134c through apertures in the trim 128c, such as apertures 152c, 154c. The apertures 152c, 154c can be sized to prevent movement of the plurality of locking arms 132c, 134c about the longitudinal axis 112c. 11. The plurality of locking arms 132c, 134c can engage at least some of the apertures 152c, 154c of the trim 128c through a snap-lock connection wherein the plurality of locking arms 132c, 134c elastically deform during passage through the apertures 152c, 154c of the trim 128c and recover after passage through the apertures 152c, 154c of the trim 128c. As best shown in FIG. 18, the locking arm 132c can include a radially-outer facing ramp 156c than rides along the aperture 152c and elastically deforms, and then snaps back to lock against the aperture 152c.

After the battery backup portion 14c has been engaged with the trim 128c, the light emitter portion 12c and the battery backup portion 14c can be interconnected by moving each of the plurality of radial portions through one of the plurality of gap portions along the longitudinal axis 112c and then rotating the light emitter portion 12c and the battery backup portion 14c relative to one another in a first angular direction about the longitudinal axis 112c and sliding each of the plurality of radial portions under the ledge portions. The ledge portions can rest on the radial portions.

Referring now to FIGS. 19-24, a lighting arrangement 10d can include a light emitter portion 12d and a battery backup portion 14d. The light emitter portion 12d can have a plurality of LEDs 108d in an array string and circuitry 110d for driving the plurality of LEDs 108d. It is noted that numerous LEDs are shown but not all LEDs are referenced with the number 108d. The exemplary circuitry 110d is embedded in a circuit board 111d.

The circuitry 110d can include a rectifier and an IC chip configured to drive the plurality of LEDs 108d, with the rectified voltage provided by the rectifier. The light emitter portion 12d can also have a trim 128d. The plurality of LEDs 108d in the array string and the circuitry 110d can be mounted on the trim 128d.

The battery backup portion 14d can be in selectively engageable electronic communication with the rectifier of the light emitter portion 12d and have a battery portion with one or more batteries and a converter portion with a DC-AC inverter. The converter portion can be connected to the rectifier and can be configured to receive power from the one or more batteries or a primary AC source. The converter portion can includes a microcontroller unit configured to route AC power to the rectifier from either the primary AC source or the battery portion when said light emitter portion 12d and said battery backup portion 14d are engaged with one another.

The schematic of FIG. 5 is applicable to the lighting arrangement 10d and can define the circuitry 110d (the right side of the Figure) and the electronic circuitry of the battery backup portion 14d (the right side of the Figure).

The light emitter portion 12d can be configured to be mounted to a junction box and positioned below a ceiling of a dwelling space during use. The battery backup portion 14d can be configured to be selectively positionable between the light emitter portion 12d and the junction box. A user can mount the light emitter portion 12d to the junction box with fasteners with or without the battery backup portion 14d. When the light emitter portion 12d and the battery backup portion 14d are engaged together, both would be positioned below the ceiling. In the exemplary embodiment, both would be at least partially visible. Thus, the exemplary the light emitter portion 12d and the battery backup portion 14d are disclosed such that the battery backup portion 14d provides a power backup while not compromising the profile of the lighting arrangement 10d on the ceiling.

The exemplary light emitter portion 12d also includes an inner lens 186d. The exemplary inner lens 186d is fixed to the circuit board 111d and encloses the LEDs 108d. A gasket 109d can be positioned between the exemplary inner lens 186d and the exemplary the circuit board 111d.

The exemplary light emitter portion 12d includes at least one mounting aperture 182d centered on a first axis 184d. The exemplary first axis 184d is transverse to the ceiling of the dwelling place when the light emitter portion 12d is engaged with the junction box. For example, the first axis 184d can be in a vertical orientation when the light emitter portion 12d is engaged with the junction box and the ceiling can be horizontal. The exemplary at least one mounting aperture 182d is defined in the trim 128d and is configured to receive a fastener 178d for interconnecting the light emitter portion 12d to the junction box. The exemplary fastener 178d passes through the trim 128d and includes a head 180d contacting the trim 128d. The exemplary fastener 178d threadingly engages the junction box.

The battery backup portion 14d includes at least one mounting aperture 188d centered on a second axis 190d. The exemplary second axis 190d is transverse to the ceiling of the dwelling place when the battery backup portion 14d is engaged with the light emitter portion 12d and the light emitter portion 12d is engaged with the junction box. The first axis 184d extends through the at least one mounting aperture 188d of the battery backup portion 14d when the battery backup portion 14d is engaged with the light emitter portion 12d and the light emitter portion 12d is engaged with the junction box. The exemplary fastener 178d also passes through the at least one mounting aperture 188d of the battery backup portion 14d.

In the fifth exemplary embodiment, the first axis 184d and the second axis 190d are collinear when the battery backup portion 14d is engaged with the light emitter portion 12d and the light emitter portion 12d is mounted to the junction box. In the fifth exemplary embodiment, a second mounting aperture 192d of the light emitter portion 12d is centered on an axis 194d. The battery backup portion 14d includes another mounting aperture 196d centered on an axis 198d. The axes 194d and 198d are collinear when the battery backup portion 14d is engaged with the light emitter portion 12d and the light emitter portion 12d is mounted to the junction box. A second fastener 200d extends through the aligned apertures 192d and 196d and threadingly engages the junction box. The exemplary mounting apertures 182d, 188d, 192d, 196d are unthreaded through-apertures. As shown in the Figures, the 182d, 188d, 192d, 196d communicate with slots so that after fasteners 178d and 200d are received, the lighting arrangement 10d can be rotated slightly to stiffen the interconnection with the junction box.

The light emitter portion 12d and the battery backup portion 14d can include one or more locking arms and one or more slots configured to receive the one or more locking arms. In the exemplary embodiment, the light emitter portion 12d includes slots 202d and 204d in the trim 128d and the battery backup portion 14d includes locking arms, such as locking arm 206d. The exemplary slots 202d and 204d are configured to receive the exemplary locking arms. The locking arms are received in the slots to engage the light emitter portion 12d and the battery backup portion 14d together. The locking arms are received in the slots by moving the light emitter portion 12d and the battery backup portion 14d closer to one another along the axis 184d.

The exemplary locking arms are positioned on a first side of the battery backup portion 14d that confronts the light emitter portion 12d when the battery backup portion 14d and the light emitter portion 12d are interconnected. The battery backup portion 14d further includes at least one battery compartment and at least one door selectively closing the at least one battery compartment. Battery compartments are referred to as pockets in the fourth embodiment of the present disclosure and the terms are synonymous. Pockets as shown in FIG. 16 can be incorporated in the battery backup portion 14d. A door in the present embodiment is referenced at 208d. The exemplary doors of the battery backup portion 14d are positioned on a second side of the battery backup portion 14d that is opposite the first side along the axis 184d. The plurality of battery compartments are positioned in spaced relation to one another about a central axis of the battery backup portion 14d and are positioned radially outward of the axis 184d.

The exemplary lighting arrangement 10d also includes an alerting LED 62d and a test button 60d. The exemplary test button 60d is in electronic communication with the battery backup portion 14d and configured such that pressing of the test button 60d places the LED 62d in electronic communication with the battery backup portion 14d. The LED 62d and the test button 60d are mounted in the battery backup portion 14d. The test button 60d and the LED 62d are directed outward along an axis 210d that extends in a first plane that is perpendicular to a second plane containing the axis 184d. The exemplary test button 60d extends past a maximum outer diameter of the trim 128d of the light emitter portion 12d.

The exemplary lighting arrangement 10d also includes a diffuser 211d. The exemplary diffuser 211d is selectively engageable with the trim 128d. The exemplary diffuser 211d includes slots that extend about an a central axis of the diffuser 211d and define a vertically-oriented opening. An exemplary slot 212d with an opening 214d is referenced in the Figures. The exemplary trim 128d includes protuberances to engage the slots. A protuberance 216d is referenced in the Figures. The diffuser 211d is raised with the protuberances aligned with the openings and then rotated so that the protuberance is moved along the slot. The exemplary diffuser 211d covers the plurality of LEDs 108d in the array string, the circuitry 110d, and the mounting apertures 182d and 202d of the light emitter portion 12d when engaged with the trim 128d.

In a first exemplary process of assembly, the diffuser 211d can be rotated and removed from the light emitter portion 12d. Wiring of the circuitry can be spliced and connected to wiring in the junction box. FIGS. 2 and 3 are incorporated here as the wiring leads from the light emitter portion 12d are the same as the wiring leads of the light emitter portion 12. After the wire connections are completed, the mounting apertures 182d, 192d of the light emitter portion 12d can be aligned with threaded apertures in the junction box. Fasteners 178d, 200d can then be inserted through mounting apertures 182d, 192d to threadingly engage the threaded apertures in the junction box. As shown in the Figures, the apertures 182d, 192d communicate with slots so that after fasteners 178d and 200d are received, the lighting arrangement 10d can be rotated slightly to stiffen the interconnection with the junction box. The fasteners 178d, 200d can be turned until the upper edge 218d of the trim 128d contacts the ceiling. The diffuser 211d can then be raised to engage the protuberances in the trim 128d and rotated until the protuberances engage the ends of the slots.

In a second exemplary process of assembly, the input wiring of the battery backup potion 14d can be spliced and connected to wiring in the junction box to connect to the primary AC source (such as the grid). In FIG. 5, the input to the battery backup portion 14d is referenced at 172. Next, wiring of the light emitter portion 12d can be spliced to the output wiring of the battery backup potion 14d. FIGS. 2 and 3 are incorporated here as the wiring leads from the light emitter portion 12d are the same as the wiring leads of the light emitter portion 12. The diffuser 211d can then be rotated and removed from the light emitter portion 12d. The battery backup portion 14d and the light emitter portion 12d can then be interconnected by inserting the locking arms (such as locking arm 206d) in the slots (such as slot 202d) and rotated relative to one another. This will align the apertures 182d, 192d with the apertures 188d, 196d. The mounting apertures 182d, 192d of the light emitter portion 12d can then be aligned with threaded apertures in the junction box. Fasteners 178d, 200d can then be inserted through mounting apertures 182d, 192d to threadingly engage the threaded apertures in the junction box. The fasteners 178d, 200d can be turned until the upper edge 220d of the battery backup portion 14d contacts the ceiling. The diffuser 211d can then be raised to engage the protuberances in the trim 128d and rotated until the protuberances engage the ends of the slots. Upon completion of the assembly process, the weight of the battery backup portion 14d rests on the trim 128d. Also, the light emitter portion 12d and the battery backup portion 14d have substantially the same outermost diameter, so the appearance of the lighting arrangement 10d does not significantly change.

It is confirmed that, if desired, the battery backup portion 14*d* can later be removed from the light emitter portion 12*d* and the light emitter portion 12*d* can be reinstalled to the junction box.

Referring now to FIGS. 25-30, a lighting arrangement 10*e* can include a light emitter portion 12*e* and a battery backup portion 14*e*. The light emitter portion 12*e* can have a plurality of LEDs 108*e* in an array string and circuitry 110*e* for driving the plurality of LEDs 108*e*. It is noted that numerous LEDs are shown but not all LEDs are referenced with the number 108*e*. The exemplary circuitry 110*e* is embedded in a circuit board 111*e*.

The circuitry 110*e* can include a rectifier and an IC chip configured to drive the plurality of LEDs 108*e*, with the rectified voltage provided by the rectifier. The light emitter portion 12*e* can also have a trim 128*e*. The plurality of LEDs 108*e* in the array string and the circuitry 110*e* can be mounted on the trim 128*e*.

The battery backup portion 14*e* can be in selectively engageable electronic communication with the rectifier of the light emitter portion 12*e* and have a battery portion with one or more batteries and a converter portion with a DC-AC inverter. The converter portion can be connected to the rectifier and can be configured to receive power from the one or more batteries or a primary AC source. The converter portion can includes a microcontroller unit configured to route AC power to the rectifier from either the primary AC source or the battery portion when said light emitter portion 12*e* and said battery backup portion 14*e* are engaged with one another.

The schematic of FIG. 5 is applicable to the lighting arrangement 10*e* and can define the circuitry 110*e* (the right side of the Figure) and the electronic circuitry of the battery backup portion 14*e* (the right side of the Figure).

The light emitter portion 12*e* can be configured to be mounted to a junction box and positioned below a ceiling of a dwelling space during use. The battery backup portion 14*e* can be configured to be selectively positionable between the light emitter portion 12*e* and the junction box. A user can mount the light emitter portion 12*e* to the junction box with fasteners with or without the battery backup portion 14*e*. When the light emitter portion 12*e* and the battery backup portion 14*e* are engaged together, both would be positioned below the ceiling. In the exemplary embodiment, both would be at least partially visible. Thus, the exemplary the light emitter portion 12*e* and the battery backup portion 14*e* are disclosed such that the battery backup portion 14*e* provides a power backup while not compromising the profile of the lighting arrangement 10*e* on the ceiling.

The exemplary light emitter portion 12*e* also includes an inner lens 186*e*. The exemplary inner lens 186*e* is fixed to the circuit board 111*e* and encloses the LEDs 108*e*. A gasket can be positioned between the exemplary inner lens 186*e* and the exemplary the circuit board 111*e*.

The exemplary light emitter portion 12*e* includes at least one mounting aperture 182*e* centered on a first axis 184*e*. The exemplary first axis 184*e* is transverse to the ceiling of the dwelling place when the light emitter portion 12*e* is engaged with the junction box. For example, the first axis 184*e* can be in a vertical orientation when the light emitter portion 12*e* is engaged with the junction box and the ceiling can be horizontal. The exemplary at least one mounting aperture 182*e* is defined in the trim 128*e* and is configured to receive a fastener 178*e* for interconnecting the light emitter portion 12*e* to the junction box. The exemplary fastener 178*e* passes through the trim 128*e* and includes a head 180*e* contacting the trim 128*e*. The exemplary fastener 178*e* threadingly engages the junction box.

The battery backup portion 14*e* includes at least one mounting aperture 188*e* centered on a second axis 190*e*. The exemplary second axis 190*e* is transverse to the ceiling of the dwelling place when the battery backup portion 14*e* is engaged with the light emitter portion 12*e* and the light emitter portion 12*e* is engaged with the junction box. The first axis 184*e* extends through the at least one mounting aperture 188*e* of the battery backup portion 14*e* when the battery backup portion 14*e* is engaged with the light emitter portion 12*e* and the light emitter portion 12*e* is engaged with the junction box. The exemplary fastener 178*e* also passes through the at least one mounting aperture 188*e* of the battery backup portion 14*e*.

In the sixth exemplary embodiment, a second mounting aperture 192*e* of the light emitter portion 12*e* is centered on an axis 194*e*. The exemplary axes 184*e* and 194*e* both extend through the mounting aperture 188*e* of the battery backup portion 14*e* when the battery backup portion 14*e* is engaged with the light emitter portion 12*e* and the light emitter portion 12*e* is engaged with the junction box. The exemplary mounting aperture of the battery backup portion 14*e* is further defined as a single aperture through which the axes 184*e* and 194*e* extend. Fasteners 178*e* and 200*e* extend through the apertures 182*e* and 192*e*, and aperture 188*e*, and threadingly engage the junction box. The exemplary mounting apertures 182*e*, 188*e*, 192*e* are unthreaded through-apertures. As shown in the Figures, the 182*e*, 192*e* communicate with slots so that after fasteners 178*e* and 200*e* are received, the lighting arrangement 10*e* can be rotated slightly to stiffen the interconnection with the junction box.

The light emitter portion 12*e* and the battery backup portion 14*e* can include one or more locking arms and one or more slots configured to receive the one or more locking arms. In the exemplary embodiment, the light emitter portion 12*e* includes slots 202*e* and 204*e* in the trim 128*e* and the battery backup portion 14*e* includes locking arms, such as locking arm 206*e*. The exemplary slots 202*e* and 204*e* are configured to receive the exemplary locking arms. The locking arms are received in the slots to engage the light emitter portion 12*e* and the battery backup portion 14*e* together. The locking arms are received in the slots by moving the light emitter portion 12*e* and the battery backup portion 14*e* closer to one another along the axis 184*e*.

The exemplary locking arms are positioned on a first side of the battery backup portion 14*e* that confronts the light emitter portion 12*e* when the battery backup portion 14*e* and the light emitter portion 12*e* are interconnected. The battery backup portion 14*e* further includes at least one battery compartment and at least one door selectively closing the at least one battery compartment. Battery compartments are referred to as pockets in the fourth embodiment of the present disclosure and the terms are synonymous. Pockets as shown in FIG. 16 can be incorporated in the battery backup portion 14*e*. A door in the present embodiment is referenced at 208*e*. The exemplary doors of the battery backup portion 14*e* are positioned on a second side of the battery backup portion 14*e* that is opposite the first side along the axis 184*e*. The plurality of battery compartments are positioned in spaced relation to one another about a central axis of the battery backup portion 14*e* and are positioned radially outward of the axis 184*e*.

The exemplary lighting arrangement 10*e* also includes an alerting LED 62*e* and a test button 60*e*. The exemplary test button 60*e* is in electronic communication with the battery backup portion 14*e* and configured such that pressing of the test button 60*e* places the LED 62*e* in electronic communication with the battery backup portion 14*e*. The LED 62*e* and the test button 60*e* are mounted in the battery backup portion 14*e*. The test button 60*e* and the LED 62*e* are directed outward along an axis 210*e* that extends in a first plane that is perpendicular to a second plane containing the axis 184*e*. The exemplary test button 60*e* extends past a maximum outer diameter of the trim 128*e* of the light emitter portion 12*e*.

The exemplary lighting arrangement 10*e* also includes a diffuser 211*e*. The exemplary diffuser 211*e* is selectively engageable with the trim 128*e*. The exemplary diffuser 211*e* includes slots that extend about an a central axis of the diffuser 211*e* and define a vertically-oriented opening. An exemplary slot 212*e* with an opening 214*e* is referenced in the Figures. The exemplary trim 128*e* includes protuberances to engage the slots. A protuberance 216*e* is referenced in the Figures. The diffuser 211*e* is raised with the protuberances aligned with the openings and then rotated so that the protuberance is moved along the slot. The exemplary diffuser 211*e* covers the plurality of LEDs 108*e* in the array string, the circuitry 110*e*, and the mounting apertures 182*e* and 202*e* of the light emitter portion 12*e* when engaged with the trim 128*e*.

In a first exemplary process of assembly, the diffuser 211*e* can be rotated and removed from the light emitter portion 12*e*. Wiring of the circuitry can be spliced and connected to wiring in the junction box. FIGS. 2 and 3 are incorporated here as the wiring leads from the light emitter portion 12*e* are the same as the wiring leads of the light emitter portion 12. After the wire connections are completed, the mounting apertures 182*e*, 192*e* of the light emitter portion 12*e* can be aligned with threaded apertures in the junction box. Fasteners 178*e*, 200*e* can then be inserted through mounting apertures 182*e*, 192*e* to threadingly engage the threaded apertures in the junction box. As shown in the Figures, the apertures 182*e*, 192*e* communicate with slots so that after fasteners 178*e* and 200*e* are received, the lighting arrangement 10*e* can be rotated slightly to stiffen the interconnection with the junction box. The fasteners 178*e*, 200*e* can be turned until the upper edge 218*e* of the trim 128*e* contacts the ceiling. The diffuser 211*e* can then be raised to engage the protuberances in the trim 128*e* and rotated until the protuberances engage the ends of the slots.

In a second exemplary process of assembly, the input wiring of the battery backup potion 14*e* can be spliced and connected to wiring in the junction box to connect to the primary AC source (such as the grid). In FIG. 5, the input to the battery backup portion 14*e* is referenced at 172. Next, wiring of the light emitter portion 12*e* can be spliced to the output wiring of the battery backup potion 14*e*. FIGS. 2 and 3 are incorporated here as the wiring leads from the light emitter portion 12*e* are the same as the wiring leads of the light emitter portion 12. The diffuser 211*e* can then be rotated and removed from the light emitter portion 12*e*. The battery backup portion 14*e* and the light emitter portion 12*e* can then be interconnected by inserting the locking arms (such as locking arm 206*e*) in the slots (such as slot 202*e*) and rotated relative to one another. This will align the apertures 182*e*, 192*e* with the apertures 188*e*, 196*e*. A portion of the battery backup portion 14*e* is received within the trim 128*e* of the light emitter portion 12*e* to reduce the increase in the profile height of the lighting arrangement 10*e*.

The mounting apertures 182*e*, 192*e* of the light emitter portion 12*e* can then be aligned with threaded apertures in the junction box. Fasteners 178*e*, 200*e* can then be inserted through mounting apertures 182*e*, 192*e* to threadingly engage the threaded apertures in the junction box. The fasteners 178*e*, 200*e* can be turned until the upper edge 220*e* of the battery backup portion 14*e* contacts the ceiling. The diffuser 211*e* can then be raised to engage the protuberances in the trim 128*e* and rotated until the protuberances engage the ends of the slots. Upon completion of the assembly process, the weight of the battery backup portion 14*e* rests on the trim 128*e*. Also, the light emitter portion 12*e* and the battery backup portion 14*e* have substantially the same outermost diameter, so the appearance of the lighting arrangement 10*e* does not significantly change.

It is confirmed that, if desired, the battery backup portion 14*e* can later be removed from the light emitter portion 12*e* and the light emitter portion 12*e* can be reinstalled to the junction box. The light emitter portion 12*e* or 12*d* can be mounted directly to the junction box without the respective battery backup portions 14*e* or 14*d*, if desired. The battery backup portions 14*d* or 14*e* can be removed either permanently or temporarily to change the rechargeable batteries held in the battery compartments.

Figure 32:
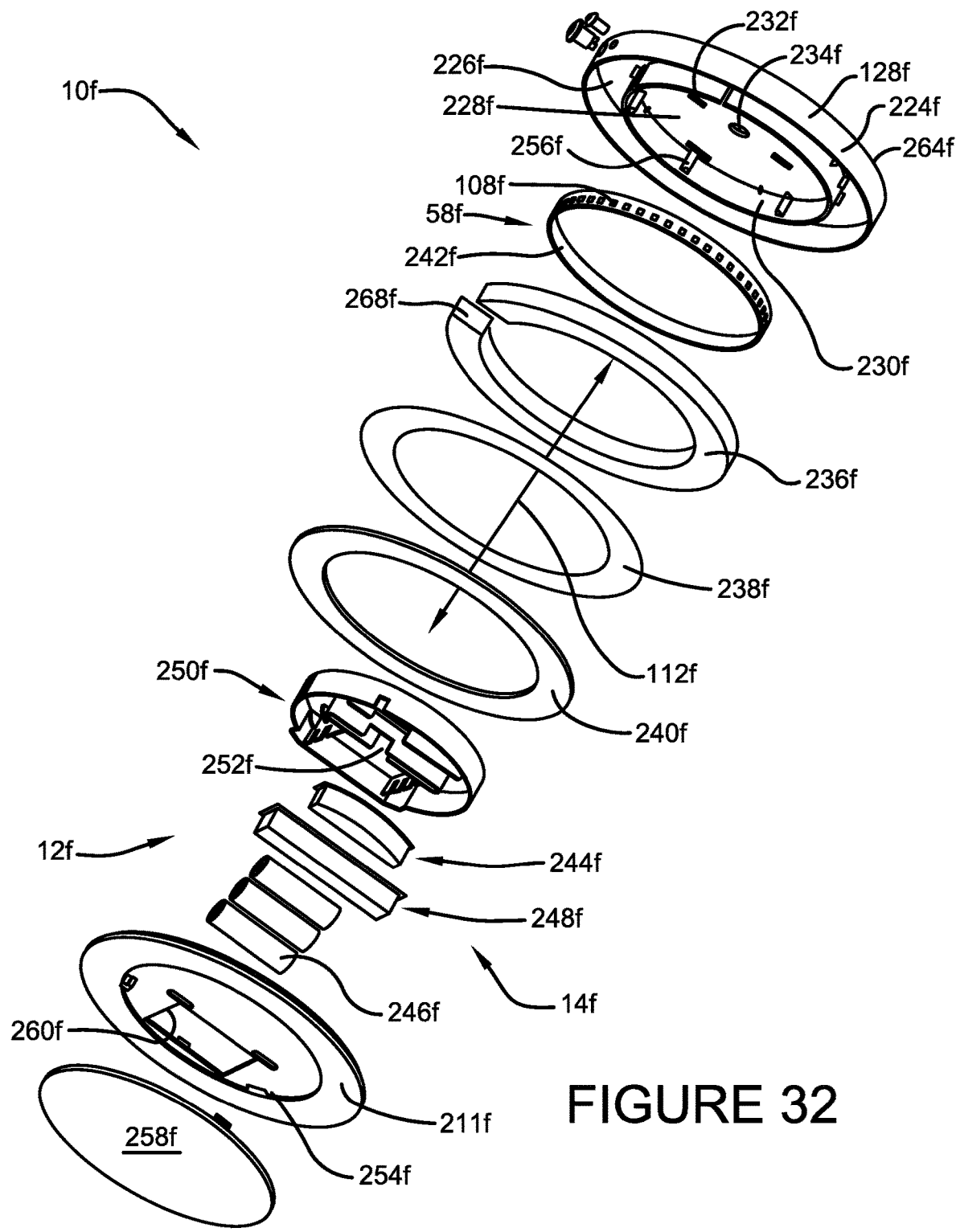
FIG. 32 is an exploded view of the seventh exemplary embodiment.
Figure 33:
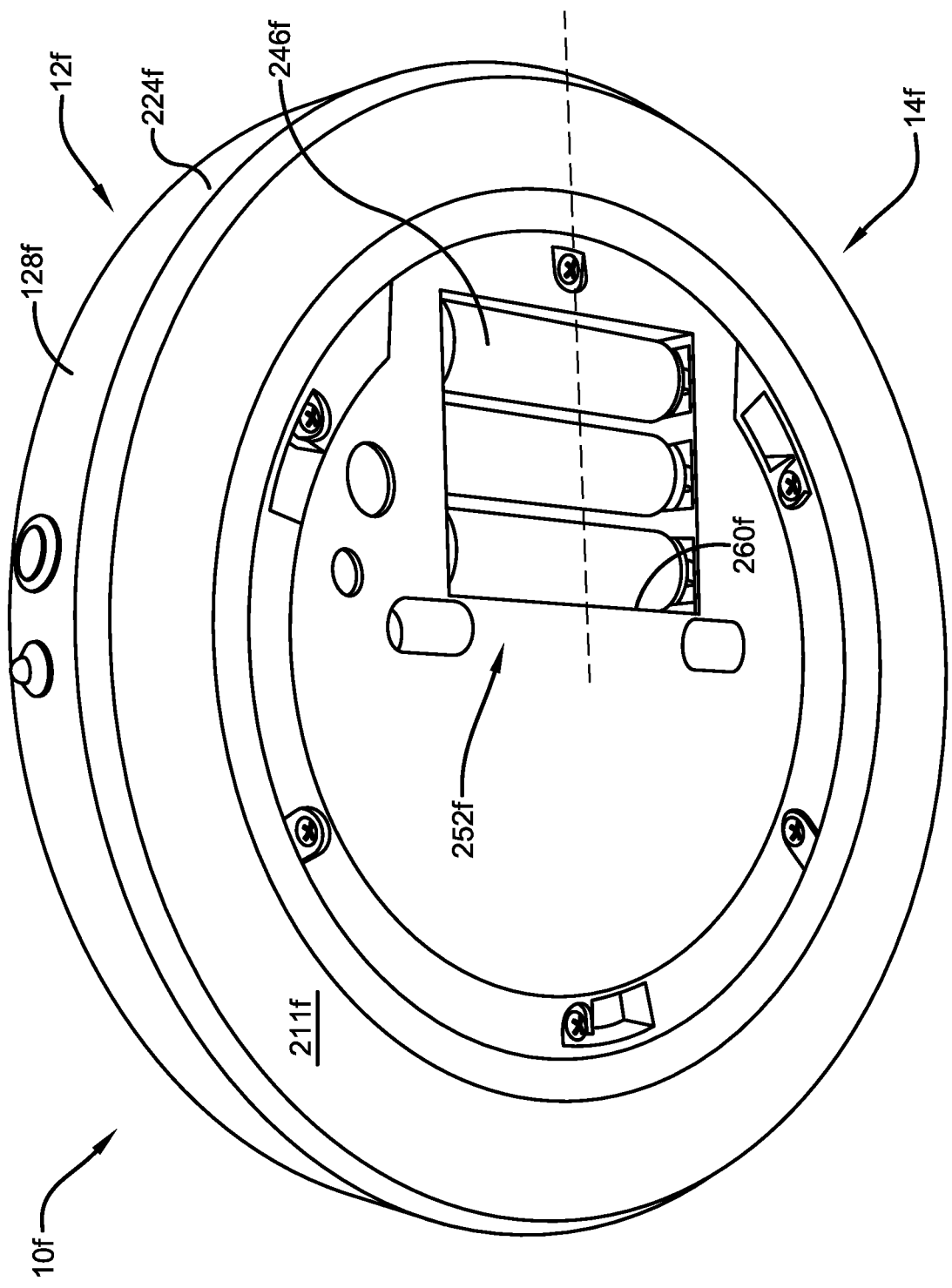
FIG. 33 is a perspective, generally-bottom view of the seventh exemplary embodiment with a front cover removed to expose a battery compartment.
Figure 34:
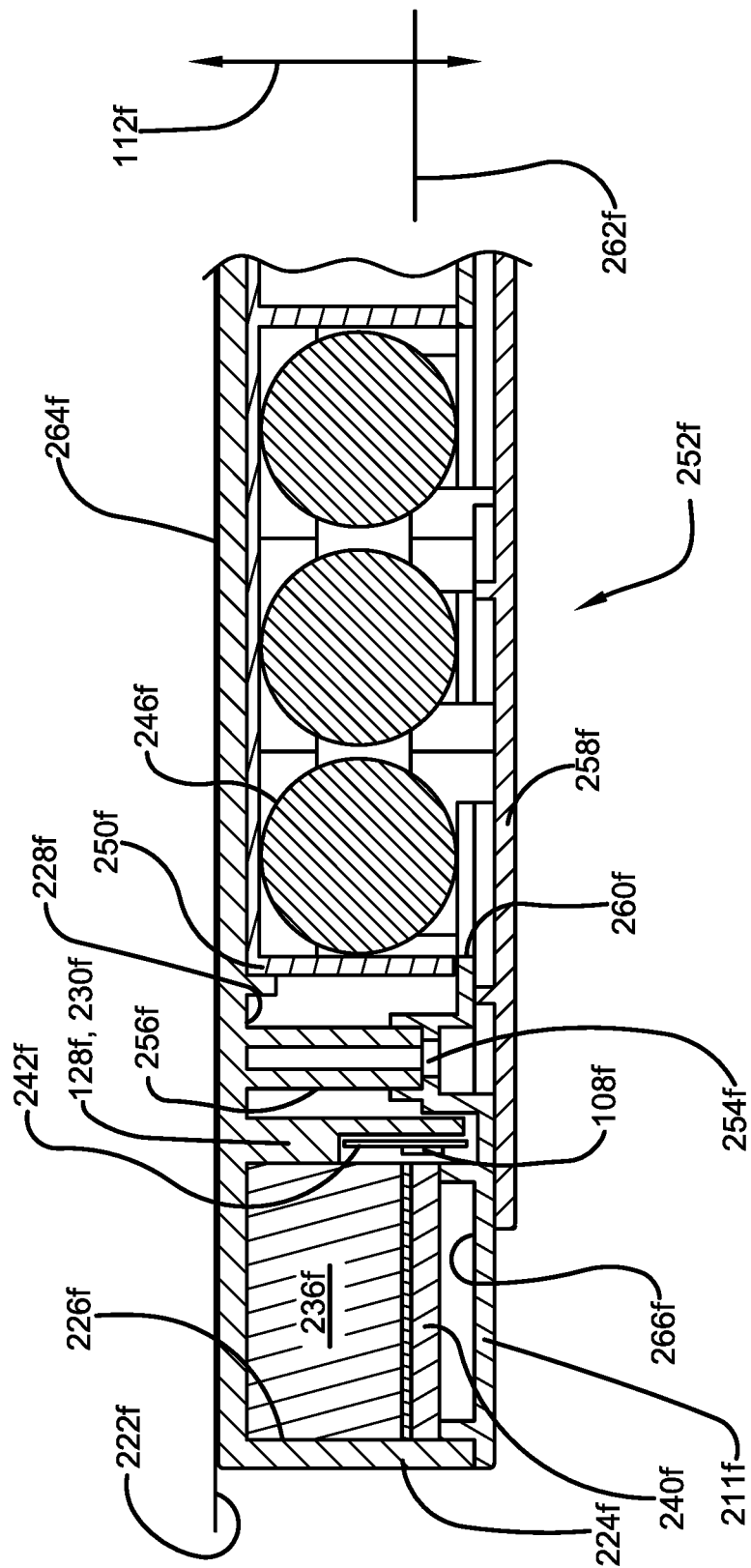
FIG. 34 is a partial cross-section of the seventh exemplary embodiment taken in a plane containing a central vertical axis of the seventh exemplary embodiment.

Referring now to FIGS. 31-34, in a seventh exemplary embodiment, a lighting arrangement 10*f* includes a light emitter portion 12*f* and a battery backup portion 14*f*. The light emitter portion 12*f* includes a trim 128*f*. The exemplary trim 128*f* is centered on a longitudinal axis 112*f*. The exemplary trim 128*f* is configured to be mounted to at least one of a wall and a ceiling during use. FIG. 34 references an exemplary ceiling at 222*f*. The plane of view of FIG. 34 is referenced by the dash line in FIG. 33. The exemplary trim 128*f* includes mounting surface 264*f* that confronts and/or contacts the ceiling 222*f*. Mounting fasteners, such as screws or bolts, can extend through apertures in the trim 128*f*, such as aperture 232*f*. The trim 128 can be mounted directly to a junction box or to the ceiling. Wiring from a primary AC source, such as the grid, can pass through the exemplary aperture 234*f*.

The exemplary trim 128*f* also includes a side wall or side 224*f* and defines a plurality of cavities. The exemplary side 224*f* of the trim 128*f* is adjacent to the mounting surface 264*f* and is exposed; the exemplary lighting arrangement 10*f* is not configured to be embedded in a wall or ceiling. The exemplary array string 58*f* and the exemplary battery backup portion 14*f* are both surrounded by the side 224*f* of the trim 128*f*. An exemplary cavity 226*f* is annular and extends about the axis 112*f*. The side 224*f* defines a radially-outer boundary of the cavity 226*f*. An exemplary cavity 228*f* is circular and the axis 112*f* extends through the cavity 228*f*. A wall 230*f* of the trim 128*f* defines a radially-outer boundary of the cavity 228*f*.

The exemplary lighting arrangement 10*f* also includes an EVA foam block 236*f*, a layer of reflective paper 238*f*, and a light guide 240*f*. The EVA foam block 236*f* can be positioned in the cavity 226*f* to keep the contents of the cavity 226*f* in place. The layer of reflective paper 238*f* and the light guide 240*f* can also be positioned in the cavity 226*f*. The layer of reflective paper 238*f* can be positioned on the bottom surface of the EVA foam block 236*f*. The term "bottom" is used to reference the orientation of the EVA foam block 236*f* when the lighting arrangement 10*f* is assembled and mounted to the ceiling 222*f*. The light guide 240*f* can be positioned adjacent to and in contact with the layer of reflective paper 238*f*.

The exemplary light emitter portion 12*f* also includes a plurality of light emitting diodes 108*f* in an array string 58*f*. The plurality of light emitting diodes 108*f* can be mounted on printed circuit boards, such as printed circuit board 242*f*.

The plurality of light emitting diodes 108f can be disposed about the radially, outwardly facing surface of wall 230f within the cavity 226f. The plurality of light emitting diodes 108f can be directed radially outwardly, at a side of the light guide 240f and generally away from the central axis 112f.

The exemplary light emitter portion 12f also includes the circuitry mounted on the trim 128f for driving the plurality of light emitting diodes 108f. The driver circuitry is referenced at 244f in FIG. 32 and also as the right-side, dash-line box in FIG. 5. The circuit schematic shown in FIG. 5 is applied in the seventh embodiment. The exemplary driving circuitry includes a rectifier and an IC chip configured to drive the plurality of light emitting diodes 108f with the rectified voltage provided by the rectifier.

The exemplary battery backup portion 14f is in electronic communication with the rectifier of the light emitter portion 12f. The exemplary battery backup portion 14f includes a battery portion with one or more batteries. The battery backup portion 14f of the seventh exemplary embodiment includes three, AA batteries, such as referenced at battery 246f. The exemplary battery backup portion 14f also includes a converter portion with a DC-AC inverter. The converter portion is referenced at 248f in FIG. 32 and as the left-side, dash-line box shown in FIG. 5. The converter portion is connected to the rectifier and configured to receive power from the one or more batteries or the primary AC source (the grid). As shown in FIG. 5, the exemplary converter portion includes a microcontroller unit configured to route AC power to the rectifier from either the primary AC source or the battery portion when the light emitter portion 12f and the battery backup portion 14f are engaged with one another.

The battery backup portion 14f and driver circuitry 244f can be positioned within a tray 250f received in the trim 128f. The exemplary tray 250f is received in the cavity 228f. The exemplary tray 250f defines a battery compartment 252f of the battery backup portion 14f. The exemplary battery compartment 252f receives the batteries 246f. The exemplary battery compartment 252f is positioned within the trim 128f and has an opening receiving the one or more batteries. The opening is directed away from the trim 128f in the exemplary embodiment, downward when the trim 128f is mounted to the ceiling during use.

The exemplary lighting arrangement 10f also includes a diffuser 211f. The exemplary diffuser 211f is selectively or releasably engageable with the trim 128f. In other words, the exemplary diffuser 211f can be mounted on the trim 128f, can be removed from the trim 128f without damage to either structure, and can be re-attached to again. Further, either component can be replaced with a newer version and engage the remaining component. Fasteners, such as screws, can pass through apertures in the diffuser 211f, such as aperture 254f, and further into bosses defined by the trim 128f, such as boss 256f. The exemplary diffuser 211f extends across and entire width of the trim 128f. The alignment of the aperture 254f and boss 256f, to receive a fastener, is shown in FIG. 34.

During a portion of the assembly of the lighting arrangement 10f, the EVA foam block 236f can be positioned in the cavity 226f. The array string 58f can also be positioned in the cavity 226f. The light guide 240f can then be positioned on the EVA foam block 236f and be radially adjacent to the LEDs 108f. The light guide 240f can be positioned between the layer of reflective paper 238f and the diffuser 211f along the axis 112f. The tray 250f containing the driving circuitry 244f and the battery backup portion 14f (with wiring interconnections) can be received in the cavity 228f. An aperture (not shown in the drawings) in the tray 250f can communicate with the aperture 234f so that wiring can extend from the driving circuitry 244f/battery backup portion 14f out of the lighting arrangement 10f. The diffuser 211f can then be placed over the trim 128f to enclose the structures noted above in this paragraph within the trim 128f. The EVA foam block 236f can be elastically deformed during assembly and urge the light guide against the diffuser 211f. Fasteners can then be screwed into the bosses.

The exemplary array string 58f is positioned in the trim 128f whereby at least a portion of light emitted from the plurality of light emitting diodes 108f is directed at a first portion of an upper face 266f of the diffuser 211f. The exemplary first portion extends generally from an outer diameter of the diffuser 211d (side 224f of the trim 128f) to the wall 230f. A second portion of the upper face 266f of the diffuser 211f is positioned adjacent to the battery backup portion 14f and is not exposed to light. The exemplary second portion extends generally inside the wall 230f. Light received by the diffuser 211f will pass through the entire diffuser 211f, but different portions of the upper face of the diffuser 211f will and will not receive light in the exemplary embodiment.

The exemplary lighting arrangement 10f also includes a cover 258f. The exemplary cover 258f is releasably engageable with the diffuser 211f. The cover 258f overlaps and covers the second portion of the diffuser 211f. The exemplary diffuser 211f is positioned between the exemplary cover 258f and the exemplary trim 128f when the diffuser 211f is engaged with the trim 128f and when the diffuser 211f and the cover 258f are engaged with one another. FIG. 33 shows the lighting arrangement 10f with the cover 258f removed.

The exemplary diffuser 211f includes an opening or aperture 260f. The exemplary aperture 260f is aligned with the battery compartment 252f when the diffuser 211f is engaged with the trim 128f. The aperture 260f overlaps the battery compartment portion of the battery backup portion 14f so that the battery compartment 252f is exposed and not enclosed by the trim 128f and the diffuser 211f. Further, the batteries, including battery 246f, is exposed and not enclosed by the trim 128f and the diffuser 211f in the exemplary embodiment. The converter portion 248f of the battery backup portion 14f is enclosed in the trim 128f by the diffuser 211f.

As shown in FIGS. 31-34, the array string 58f extends at least partially about the battery backup portion 14f. The path of the exemplary array string 58f is centered on the longitudinal axis 112f. The exemplary embodiment is circular, so the array string 58f extends at least partially around the battery backup portion 14f. But in alternative embodiments, the path of the array string 58f could be square or any other shape. The exemplary array string 58f extends fully about the battery backup portion 14f.

The array string 58f extends along a path at least partially about the longitudinal axis 112f. An exemplary plane referenced at 262f in FIG. 34 is normal to the longitudinal axis 112f. The exemplary plane 262f intersects the array string 58f and also intersects the battery 246f of the battery backup portion 14f. The exemplary the battery backup portion 14f is closer to the longitudinal axis 112f than the array string 58f in the plane 262f. The point of the battery backup portion 14f in the plane 262f that is closest to the axis 112f is closer to the axis 112f that the point of the array string 58f that is closest to the axis 112f. In other embodiments, the battery backup portion 14f can be on the outside of the array string 58f.

Figure 31:
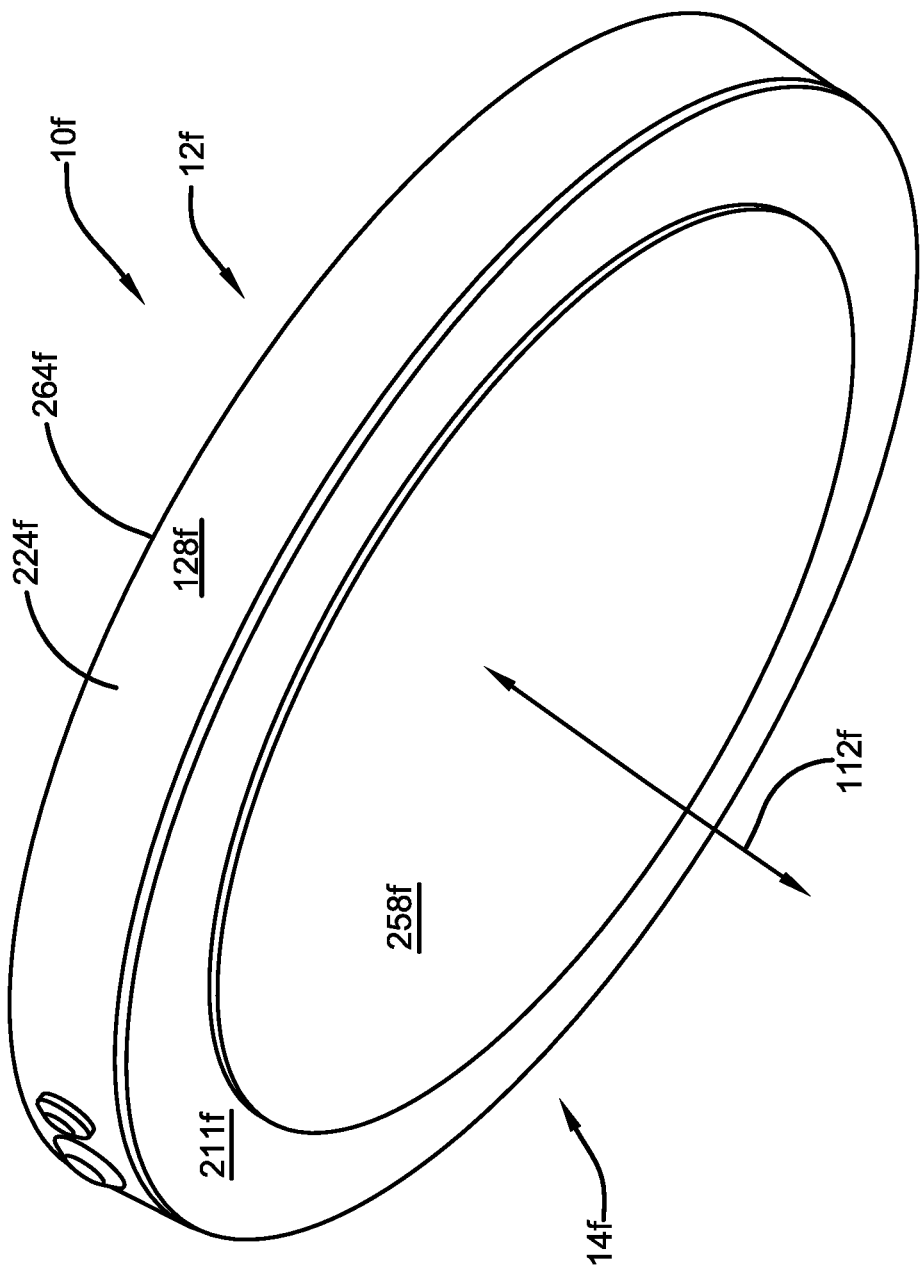
FIG. 31 is a perspective, generally-bottom view of a seventh exemplary embodiment of the present disclosure.

The battery backup portion 14f can also include a test circuit with a push test button, referenced at 60f in FIGS. 31-33. A testing LED 62f and the test button 60f are mounted in the trim 128f, positioned in the cavity 266 in a gap 268f in the EVA foam block 236f. When the button 60f is pressed, an LED 62f will be powered by the battery backup portion 14f if the battery backup portion 14f has power. The exemplary test button 60f is in electronic communication with the battery backup portion 14f and configured such that pressing of the test button places the testing light emitting diode 62f in electronic communication with the battery backup portion 14f. The testing light emitting diode 62f and the test button 60f are mounted in the battery backup portion 14f. The test button 60f and the testing light emitting diode 62f are positioned in the side 224f of the trim 128f. The exemplary test button 60f extends past a maximum outer diameter of the trim 128f.

Figure 20:
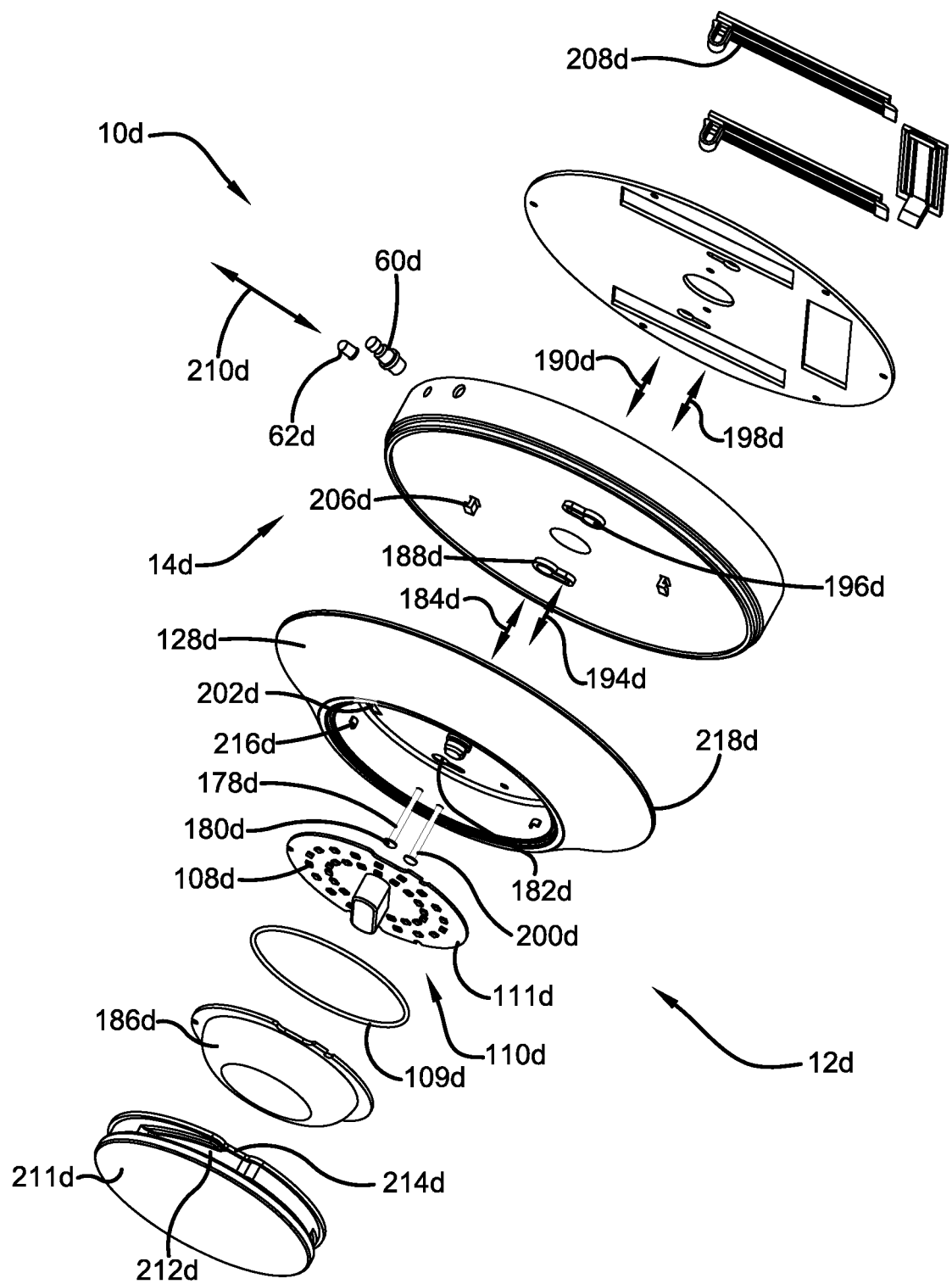
FIG. 20 is an exploded view of the fifth exemplary embodiment.
Figure 21:
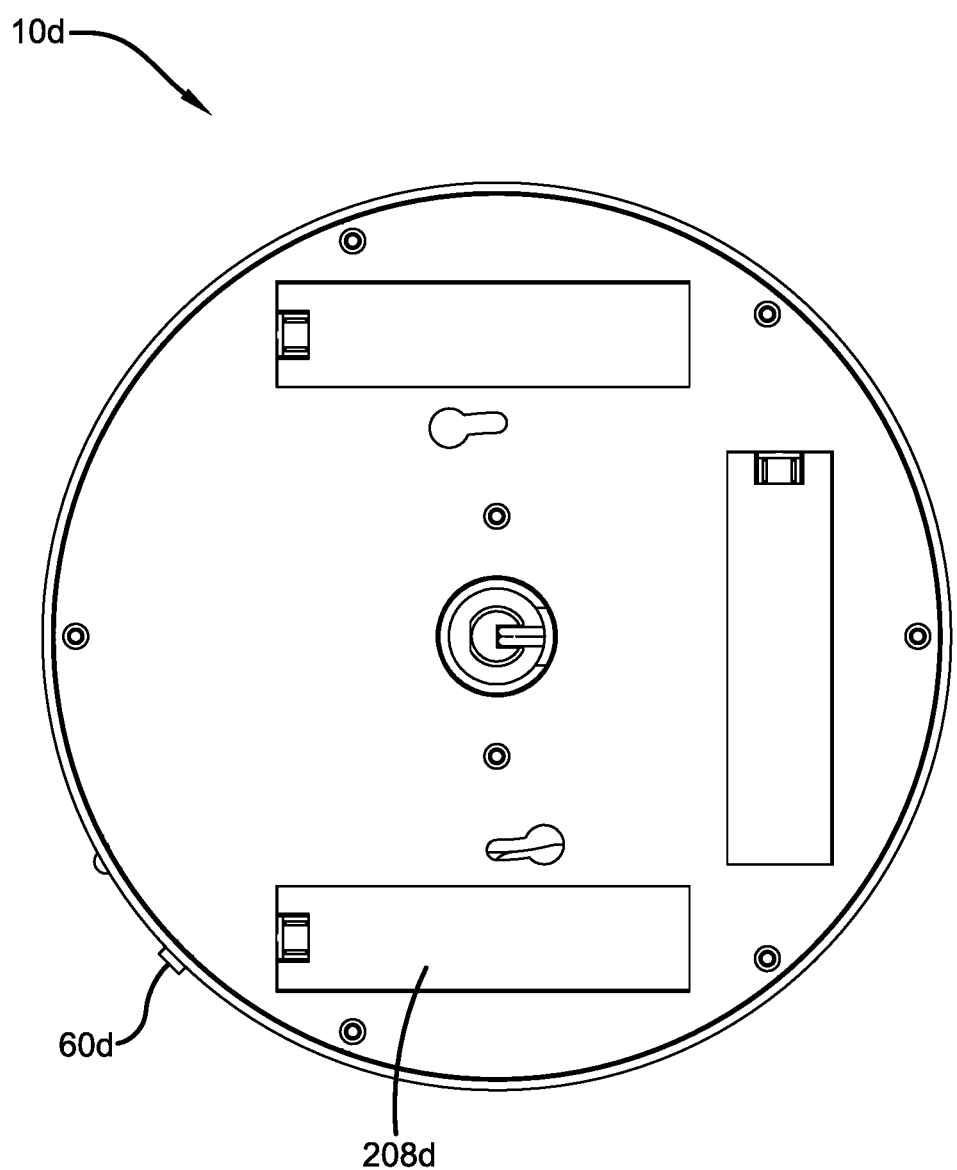
FIG. 21 is a top view of the fifth exemplary embodiment.
Figure 22:
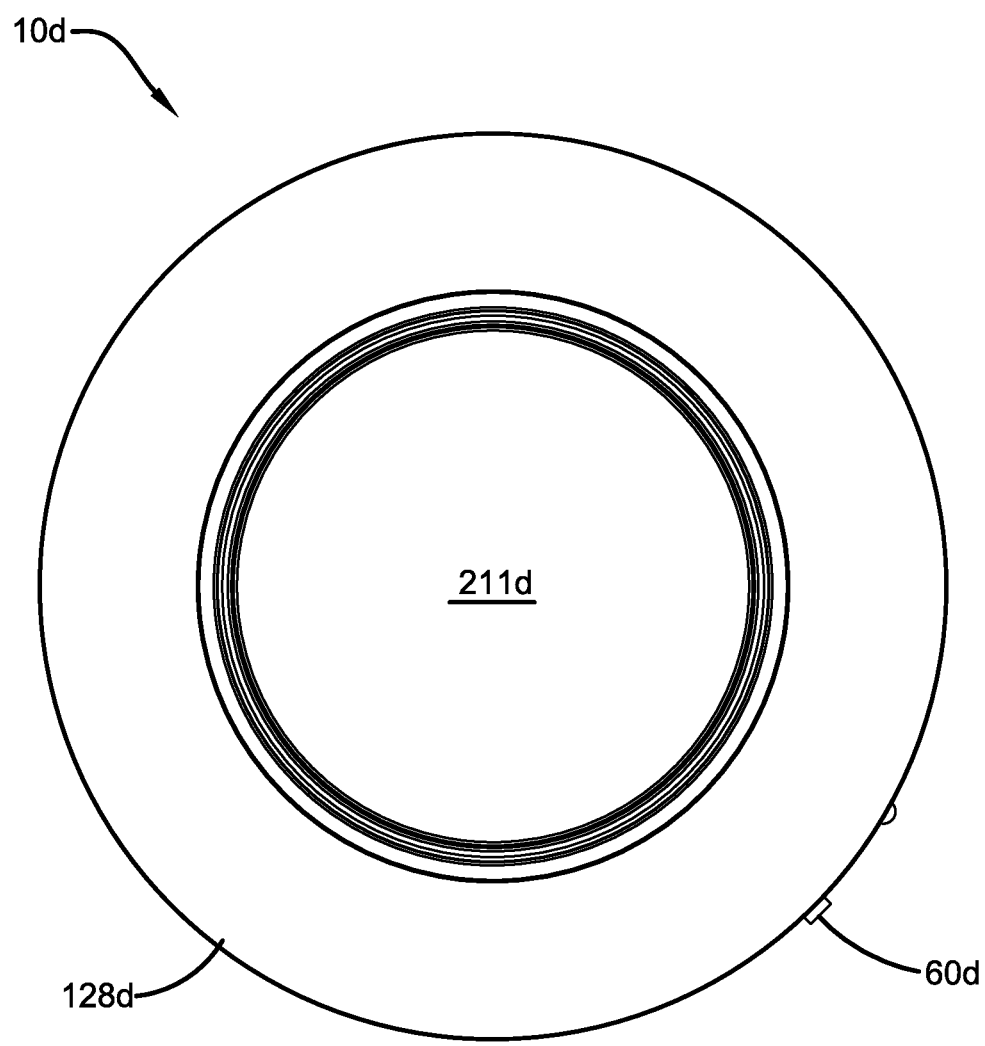
FIG. 22 is a bottom view of the fifth exemplary embodiment.
Figure 23:
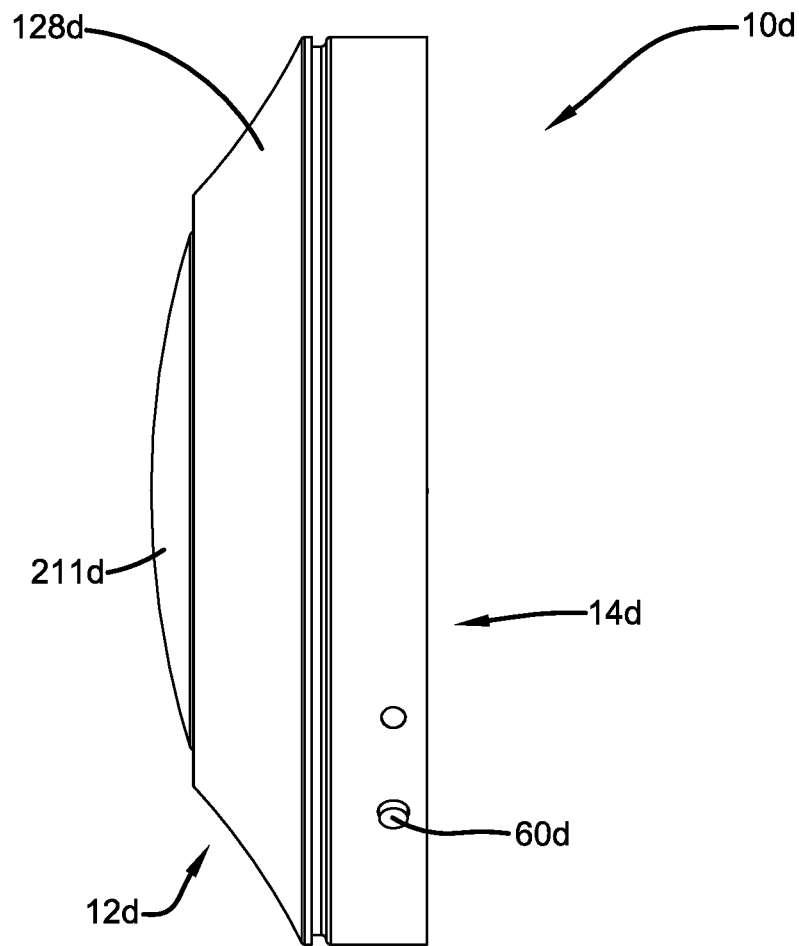
FIG. 23 is a side view of the fifth exemplary embodiment.
Figure 24:
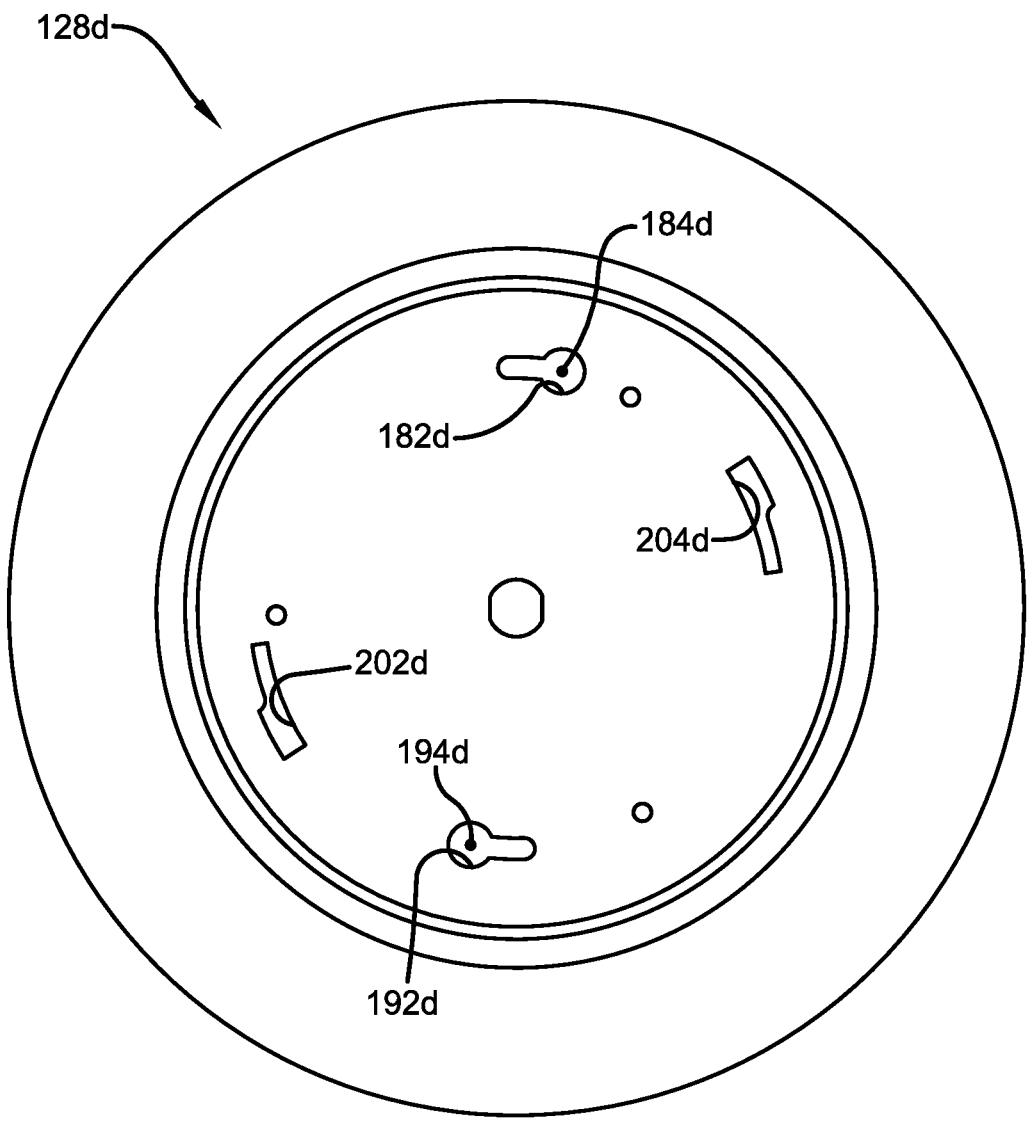
FIG. 24 is a bottom view of a trim of the fifth exemplary embodiment.
Figure 25:
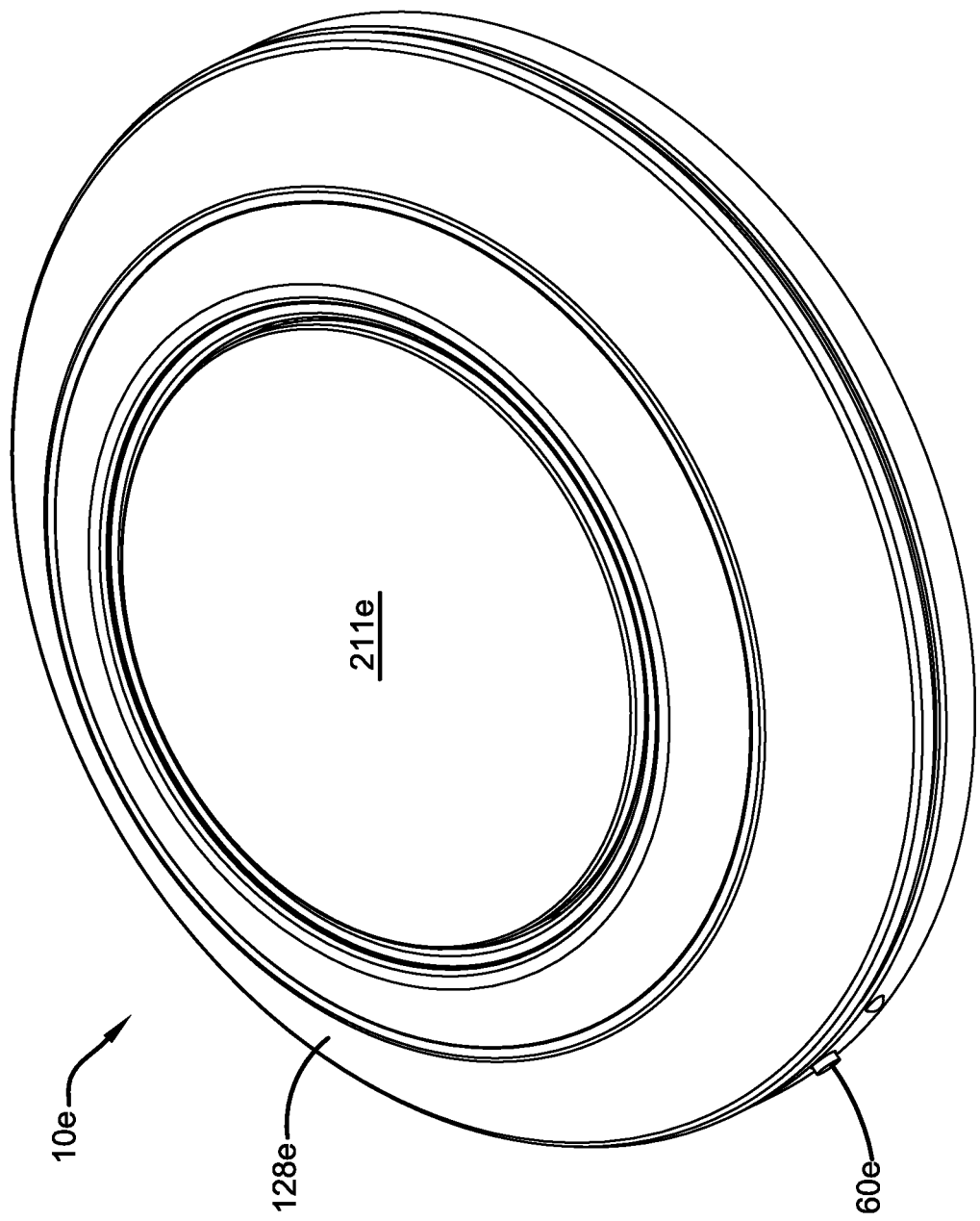
FIG. 25 is a perspective view of a sixth exemplary embodiment according to one or more implementations of the present disclosure.
Figure 26:
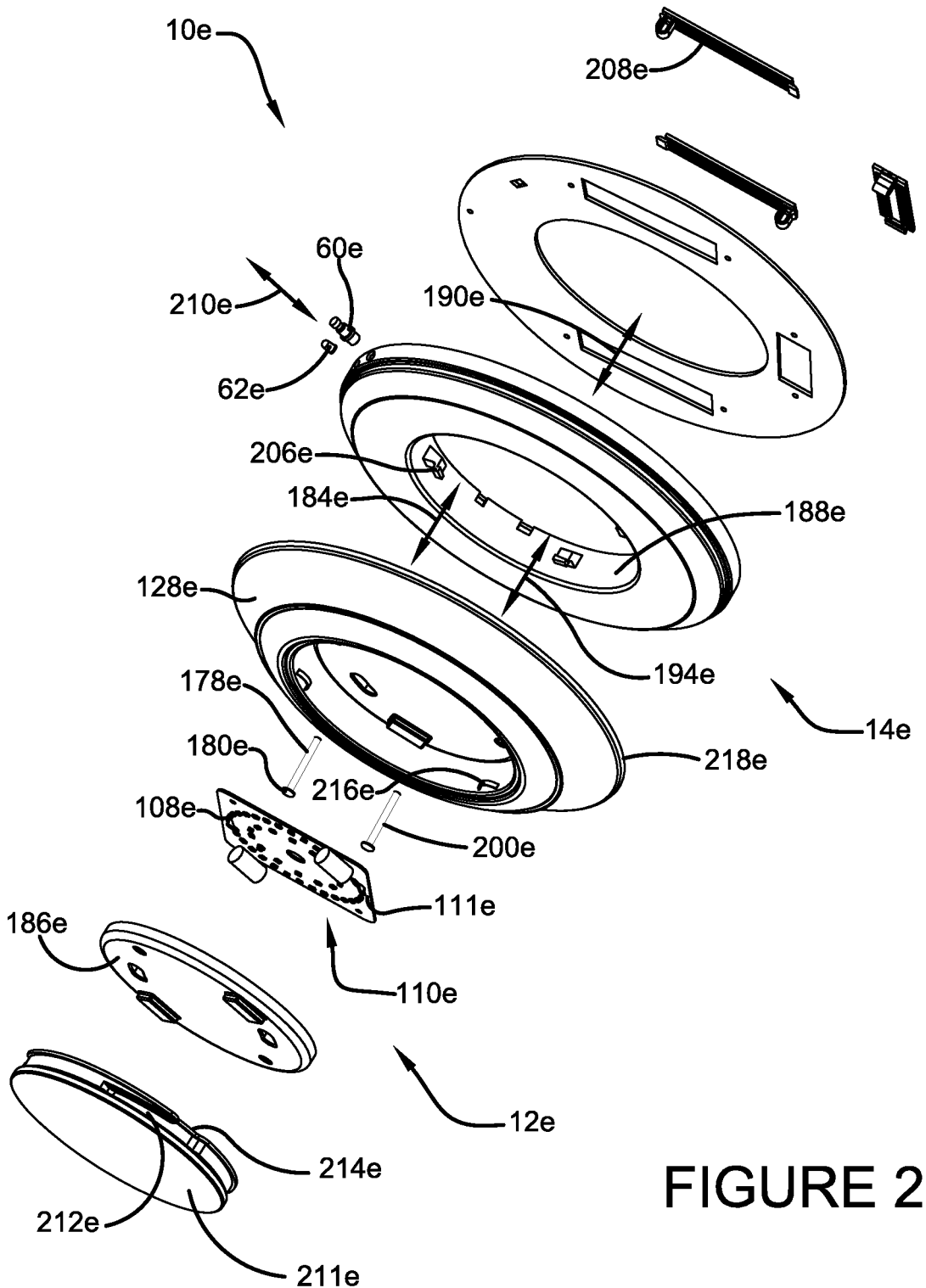
FIG. 26 is an exploded view of the sixth exemplary embodiment.
Figure 27:
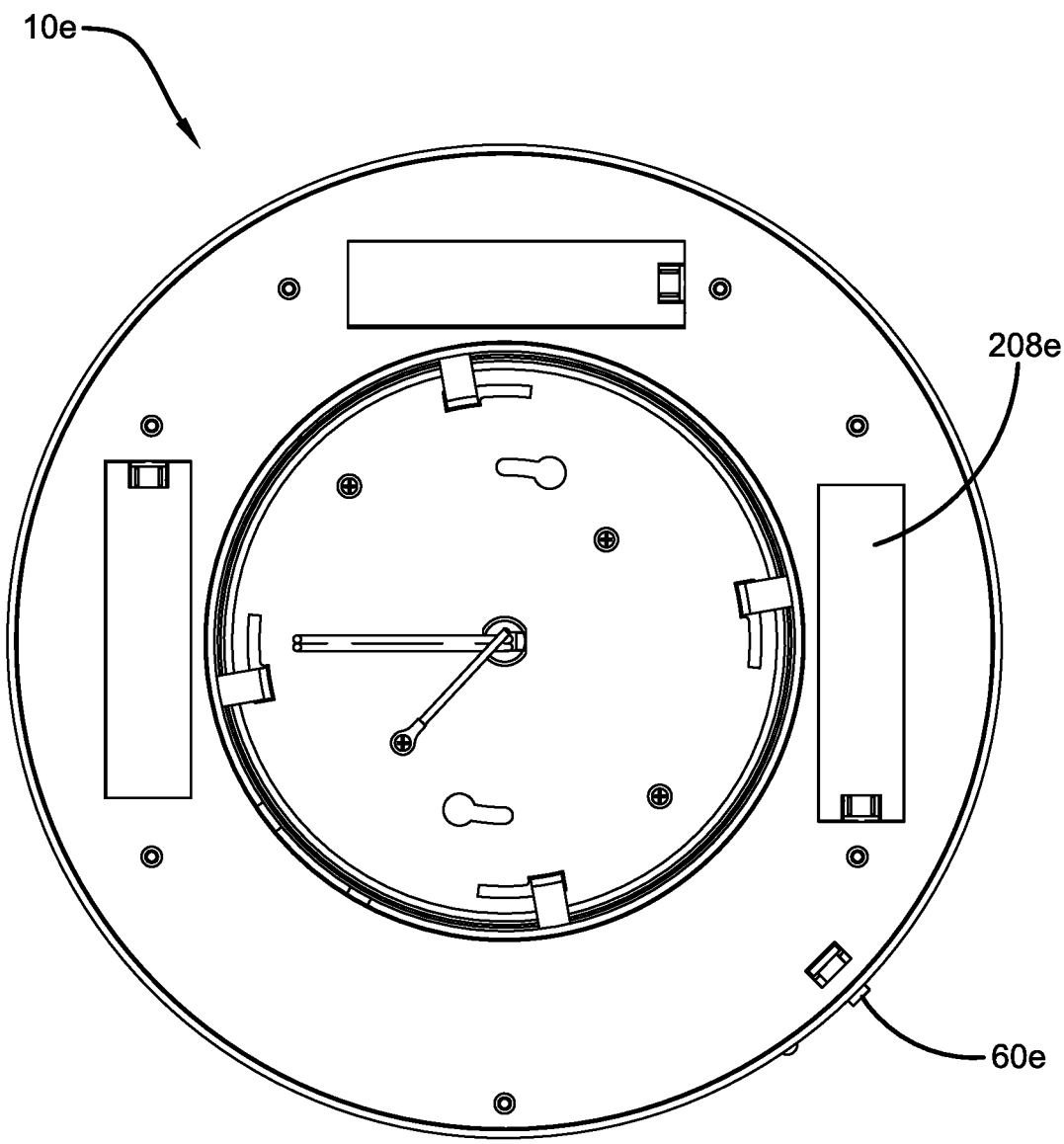
FIG. 27 is a top view of the sixth exemplary embodiment.
Figure 28:
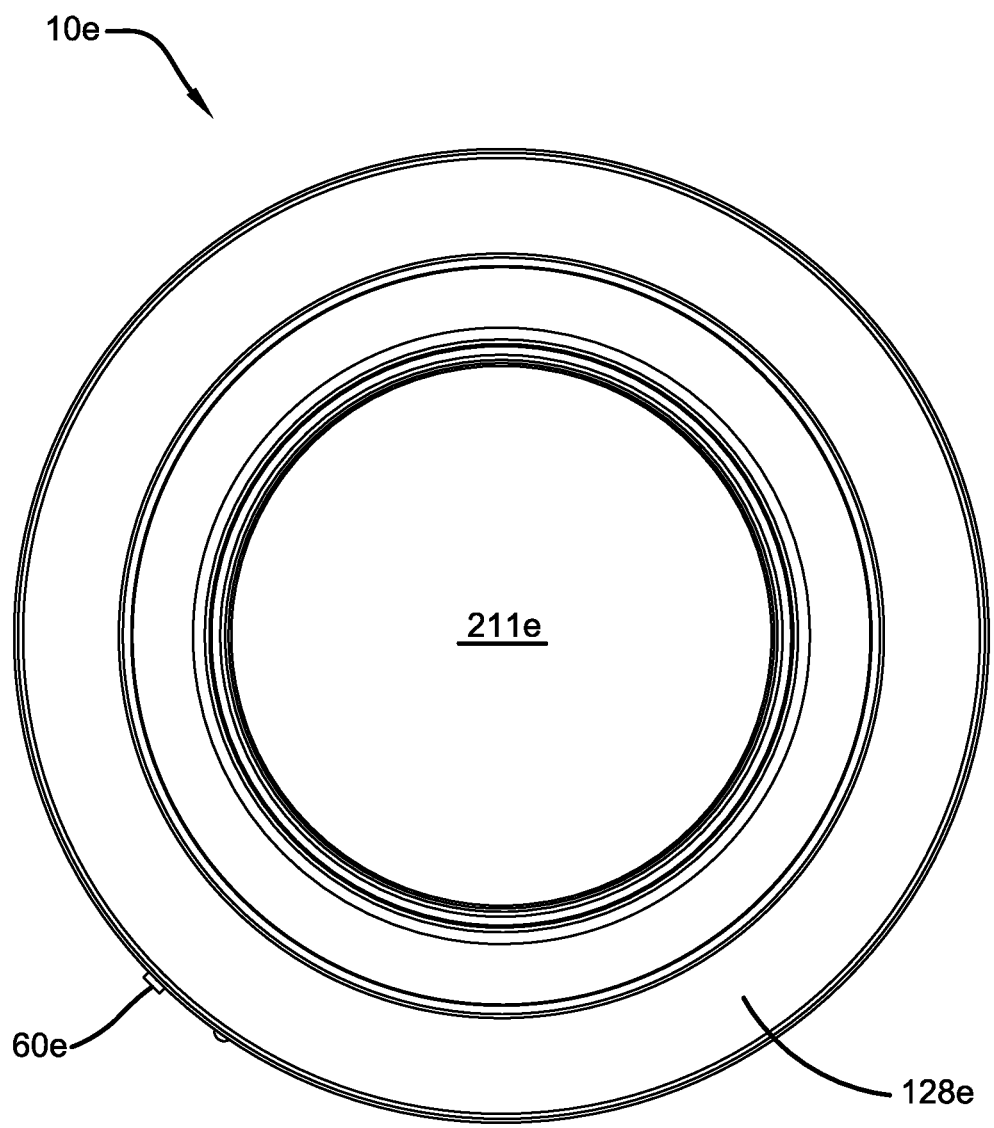
FIG. 28 is a bottom view of the sixth exemplary embodiment.
Figure 29:
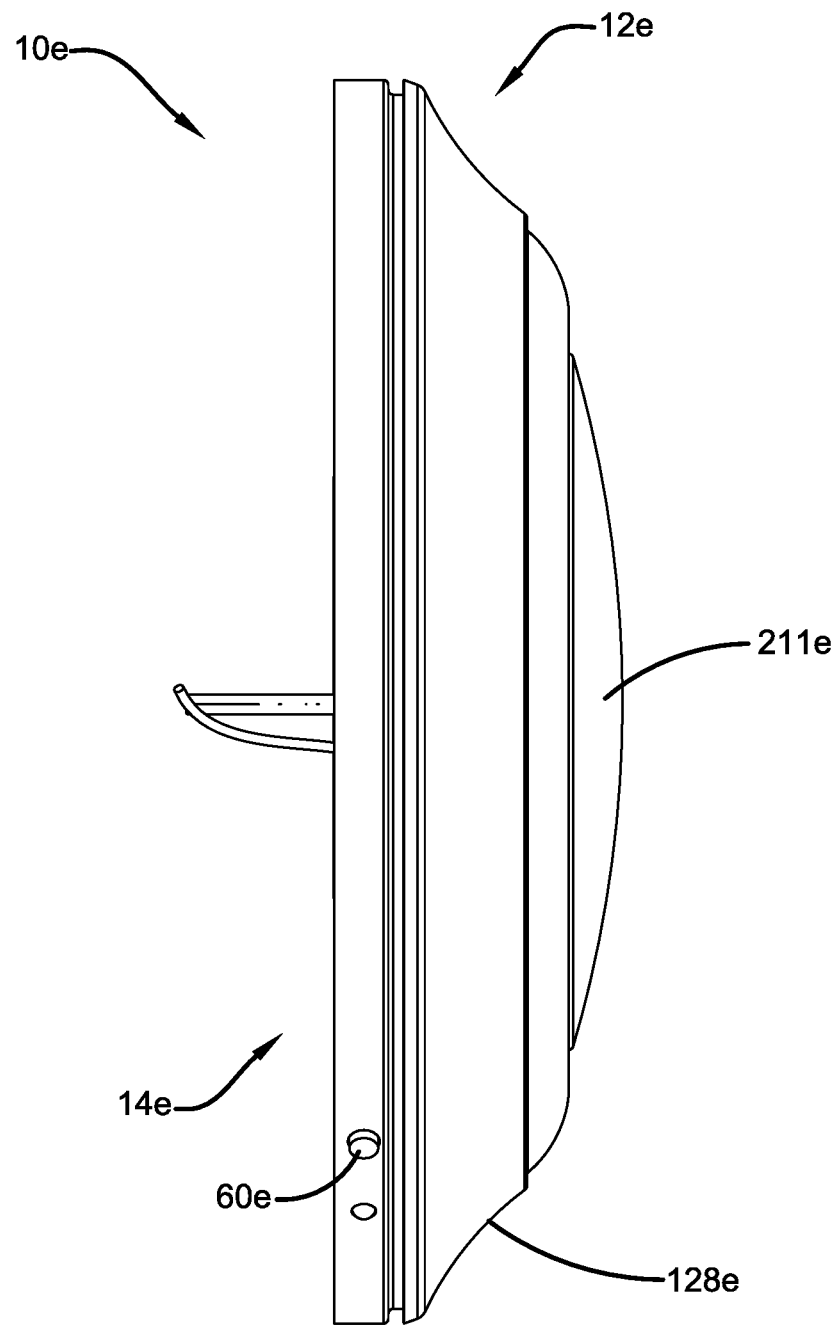
FIG. 29 is a side view of the sixth exemplary embodiment.
Figure 30:
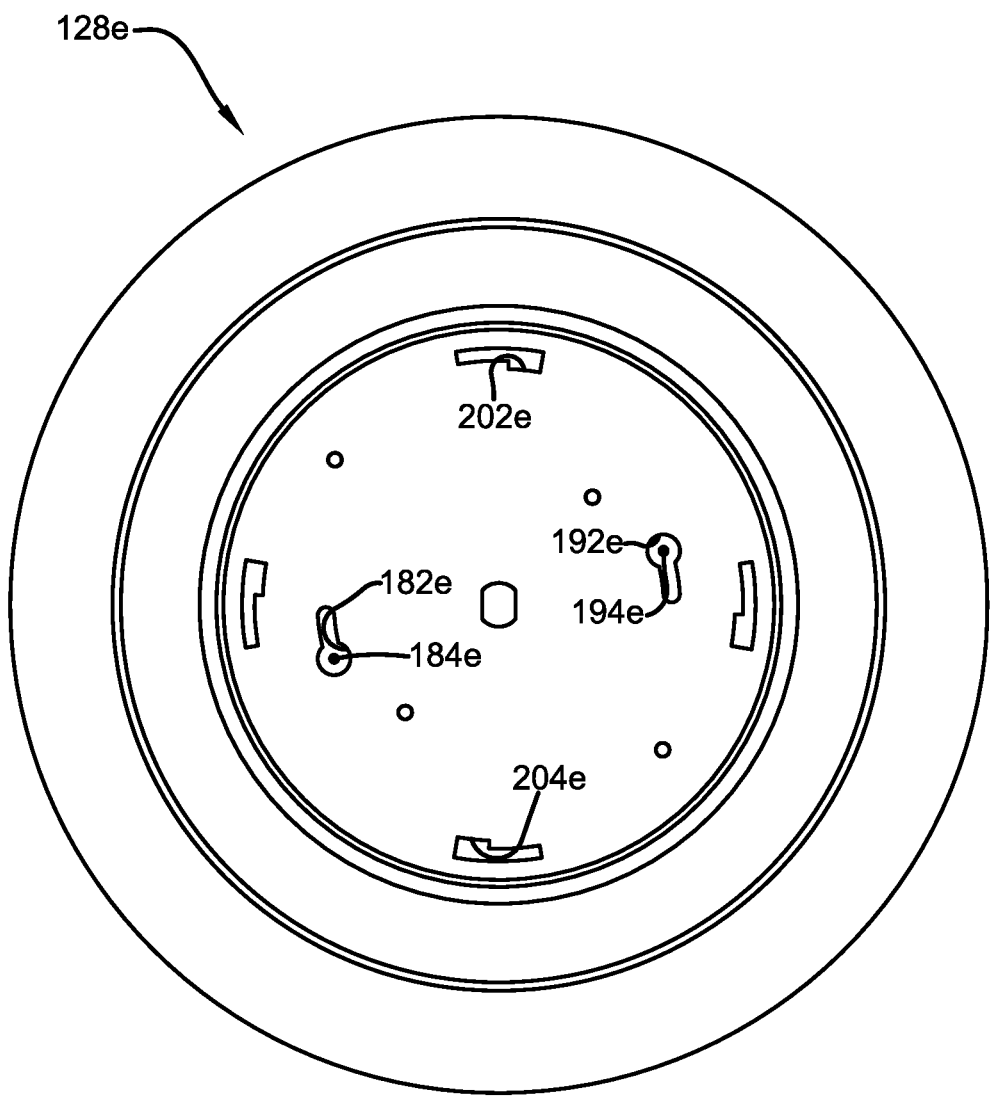
FIG. 30 is a perspective, generally-bottom view of a trim of the sixth exemplary embodiment.

In another embodiment of the present disclosure, the design shown in FIGS. 31-34 could be modified wherein the PCB 242f is formed as a flat ring rather than a cylindrical ring. The PCB could be positioned in the cavity 226f, laying flat in a plane perpendicular to the axis 112f, with the LEDs 108f directed to emit light generally parallel to the axis 112f, directly at the diffuser 211f. Further, this embodiment could include a dual lens arrangement such as shown in FIG. 20. A first lens similar in function to the inner lens 186d could be positioned between the LEDs 108f and the diffuser 211f (the diffuser 211f thus acting as an outer lens). An inner lens for the embodiment would not be dome-like to cover all LEDS, such as the inner lens 186f, but could be an individual dome for a single LED or could be one of various other shapes. For example, each LED 108f could be covered by an inner, hemispherical lens similar to lens 24 in U.S. Pub. No. 2017/0191642, which is incorporated herein by reference. The cross-section in FIG. 8 of the '642 publication could alternatively be applied in a ring about the axis 112f so that a single inner lens cover all of the LEDs 108f. U.S. Pat. No. 8,651,707 is also incorporated herein by reference for possible cross-sections of single or multiple inner lens' that could be applied in an embodiment of the present disclosure. U.S. Pub. No. 2011/0019425 is also incorporated herein by reference for possible cross-sections of inner lens that could be applied in an embodiment of the present disclosure.

While the present disclosure has been described with reference to exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiments disclosed as the best mode contemplated for carrying out this present disclosure, but that the present disclosure will include all embodiments falling within the scope of the appended claims. The right to claim elements and/or sub-combinations that are disclosed herein as other present disclosures in other patent documents is hereby unconditionally reserved. The use of the word "can" in this document is not an assertion that the subject preceeding the word is or is not unimportant or unnecessary or "not critical" relative to anything else in this document. The word "can" is used herein in a positive and affirming sense and no other motive should be presumed. Further, more than one "invention" may be disclosed in the present disclosure; an "invention" is defined by the content of a patent claim and not by what a detailed description of an embodiment.

What is claimed is:

1. A lighting arrangement comprising:
    a light emitter portion having a plurality of light emitting diodes in an array string and circuitry for driving said plurality of light emitting diodes including a rectifier and an IC chip configured to drive said plurality of light emitting diodes with the rectified voltage provided by said rectifier, said light emitter portion also having a trim wherein said plurality of light emitting diodes in said array string and said circuitry mounted on said trim;
    a battery backup portion in electronic communication with said rectifier of said light emitter portion and having: a battery portion with one or more batteries and a converter portion with a DC-AC inverter, said converter portion connected to said rectifier and configured to receive power from said one or more batteries or a primary AC source, and said converter portion including a microcontroller unit, said microcontroller unit configured to route AC power to said rectifier from either the primary AC source or said battery portion when said light emitter portion and said battery backup portion are engaged with one another;
    said light emitter portion configured to be mounted to at least one of a wall and a ceiling during use; and
    said battery backup portion is positioned within said trim, with said plurality of light emitting diodes in said array string.

2. The lighting arrangement of claim 1 wherein said array string extends at least partially about said battery backup portion.

3. The lighting arrangement of claim 2 wherein said array string extends fully about said battery backup portion.

4. The lighting arrangement of claim 2 wherein said trim is centered on a longitudinal axis, said array string extends along a path at least partially about said longitudinal axis, a plane normal to said longitudinal axis intersects said array string, and said plane also intersects said battery backup portion.

5. The lighting arrangement of claim 4 wherein said battery backup portion is closer to said longitudinal axis than said array string in said plane.

6. The lighting arrangement of claim 4 wherein said path of said array string is centered on said longitudinal axis.

7. The lighting arrangement of claim 1 wherein said trim of said light emitter portion includes a mounting surface configured to be mounted against the at least one of the wall and the ceiling during use such that a side of said trim, adjacent to said mounting surface, is exposed.

8. The lighting arrangement of claim 7 wherein said array string and said battery backup portion are both surrounded by said side of said trim.

9. The lighting arrangement of claim 8 further comprising:
    a testing light emitting diode; and
    a test button in electronic communication with said battery backup portion and configured such that pressing of the test button places said testing light emitting diode in electronic communication with said battery backup portion, wherein said testing light emitting diode and said test button are mounted in said battery backup portion, and wherein said test button and said testing light emitting diode are positioned in said side of said trim.

10. The lighting arrangement of claim 9 wherein said test button is further defined as extending past a maximum outer diameter of said trim of said light emitter portion.

11. The lighting arrangement of claim 1 further comprising:
a diffuser selectively engageable with said trim, said trim defining one or more cavities, said array string and said battery backup portion received in said one more cavities, said diffuser enclosing said array string in said trim when said diffuser is engaged with said trim.

12. The lighting arrangement of claim 11 wherein said diffuser includes an opening and said opening overlaps at least a portion of said battery backup portion whereby said at least a portion of said battery backup portion is exposed and not enclosed by said trim and said diffuser.

13. The lighting arrangement of claim 11 wherein said at least a portion of said battery backup portion that is exposed and not enclosed by said trim and said diffuser is further defined as at least said one or more batteries.

14. The lighting arrangement of claim 13 wherein said at least a portion of said battery backup portion that is exposed and not enclosed by said trim and said diffuser is further defined as only said one or more batteries of said battery backup portion.

15. The lighting arrangement of claim 14 further comprising:
a cover releasably engageable with said diffuser, said diffuser positioned between said cover and said trim when said diffuser is engaged with said trim and when said diffuser and said cover are engaged with one another.

16. The lighting arrangement of claim 11 wherein said array string is positioned in said trim whereby at least a portion of light emitted from said plurality of light emitting diodes is directed at a first portion of an upper face of said diffuser and wherein a second portion of said upper face of said diffuser is positioned adjacent to said battery backup portion and is not exposed to light.

17. The lighting arrangement of claim 11 wherein said diffuser extends across and entire width of said trim.

18. The lighting arrangement of claim 11 wherein:
said battery backup portion further comprises at least one battery compartment receiving said one or more batteries; and
said diffuser further comprises at least one aperture wherein said aperture is aligned with said at least one battery compartment when said diffuser is engaged with said trim.

19. The lighting arrangement of claim 18 further comprising:
a cover selectively engageable with said diffuser, said diffuser positioned between said cover and said trim when said diffuser is engaged with said trim and when said diffuser and said cover are engaged with one another, and said cover closing said battery compartment when said cover is engaged with said diffuser.

20. The lighting arrangement of claim 1 wherein said battery backup portion further comprises at least one battery compartment positioned within said trim and having an opening receiving said one or more batteries and wherein said opening is directed away from said trim, downward when said trim is mounted to the ceiling during use.

21. The lighting arrangement of claim 1 further comprising:
an inner lens covering at least one of said a plurality of light emitting diodes; and
an outer lens covering said inner lens, said outer lens being a diffuser.

* * * * *